(12) United States Patent
Eng Soon et al.

(10) Patent No.: US 7,252,309 B2
(45) Date of Patent: Aug. 7, 2007

(54) CONTAINERISED HANDLING OF BULK MATERIALS AND APPARATUS THEREFOR

(75) Inventors: Goh Eng Soon, Singapore (SG); Goh Eng Hock, Singapore (SG)

(73) Assignee: Bee Kim Ong, Singapore (SG)

(*) Notice: Subject to any disclaimer, the term of this patent is extended or adjusted under 35 U.S.C. 154(b) by 506 days.

(21) Appl. No.: 10/480,575

(22) PCT Filed: Jun. 13, 2002

(86) PCT No.: PCT/SG02/00119

§ 371 (c)(1),
(2), (4) Date: Dec. 12, 2003

(87) PCT Pub. No.: WO02/100741

PCT Pub. Date: Dec. 19, 2002

(65) Prior Publication Data

US 2004/0206646 A1    Oct. 21, 2004

(30) Foreign Application Priority Data

Jun. 13, 2001   (SG) .................................. 0103487-5

(51) Int. Cl.
*B67D 5/06*    (2006.01)
(52) U.S. Cl. .................. 285/185.1; 285/460; 105/310; 105/250; 105/251
(58) Field of Classification Search ............ 222/185.1, 222/460, 457, 462; 105/310, 240, 250, 251
See application file for complete search history.

(56) References Cited

U.S. PATENT DOCUMENTS 3,187,684 A * 6/1965 Ortner ........................ 105/248
3,387,570 A * 6/1968 Pulcrano et al. .......... 105/282.3
3,805,708 A * 4/1974 Schuller et al. ............. 105/251
3,945,619 A   3/1976 Taibi ........................... 366/18

(Continued)

FOREIGN PATENT DOCUMENTS

EP           242820           12/1989

(Continued)

OTHER PUBLICATIONS

International Search Report for PCT/SG02/00119 mailed Oct. 4, 2002; ISA/AU.

*Primary Examiner*—Patrick F. Brinson
(74) *Attorney, Agent, or Firm*—Harness, Dickey & Pierce, P.L.C.

(57) ABSTRACT

A freight container (10) has a base (20) or a portion thereof that can be opened to discharge its contents. This container (10) has a top which can be opened in similar manner as the base. Another container having at least one compartment, each compartment having a lower section with a reducing cross-sectional area and a pivotably operable closure assembly, with several such closure assemblies being linked together by means of bars. Such a container is used to contain raw building materials for stockpiling of these materials at a container port. It is also used to supply materials to a concrete production plant whee pollution control containers are provided below the supply container and above the scaling and mixing stations to reduce particulate pollution. A pair of slewing apparatuses is also provided to engage both ends of a container and turn the container over about its longitudinal axis, thereby emptying its contents.

16 Claims, 19 Drawing Sheets

U.S. PATENT DOCUMENTS

| | | | |
|---|---|---|---|
| 3,986,708 A | 10/1976 | Heltzel et al. | 366/17 |
| 4,095,708 A | 6/1978 | Gerhard | 414/420 |
| 4,194,450 A * | 3/1980 | Miller | 105/253 |
| 4,222,334 A * | 9/1980 | Peterson | 105/250 |
| 4,224,877 A | 9/1980 | Stark et al. | 105/250 |
| 4,550,665 A | 11/1985 | Brouwer | 105/241.2 |
| 4,580,502 A | 4/1986 | Ritzl et al. | 105/240 |
| 5,121,989 A | 6/1992 | Horton et al. | 366/18 |
| 5,441,321 A | 8/1995 | Karpisek | 294/68.21 |
| 5,785,421 A | 7/1998 | Milek | 366/33 |

FOREIGN PATENT DOCUMENTS

GB  2065594  7/1981

\* cited by examiner

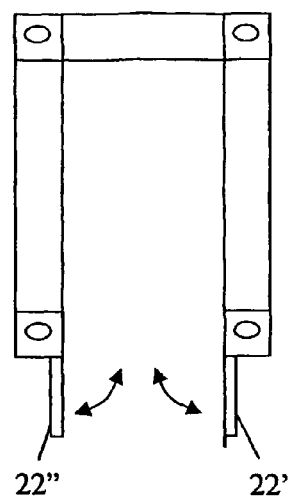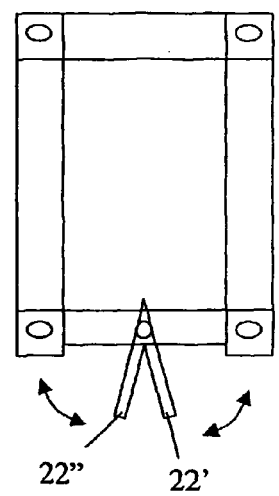
Fig. 2b  Fig. 2d
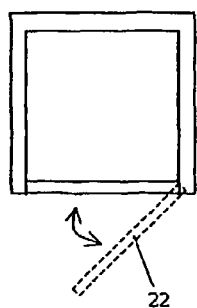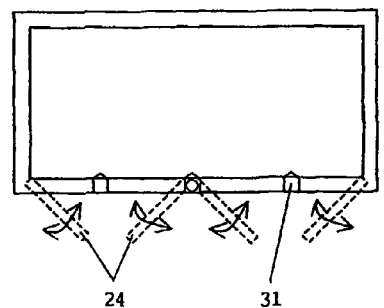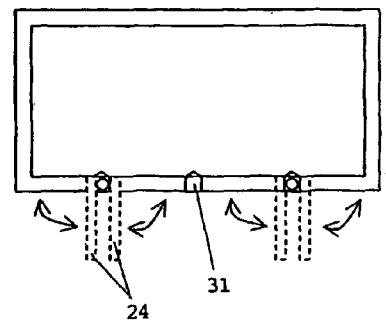
Fig. 2a  Fig. 2c  Fig. 2e

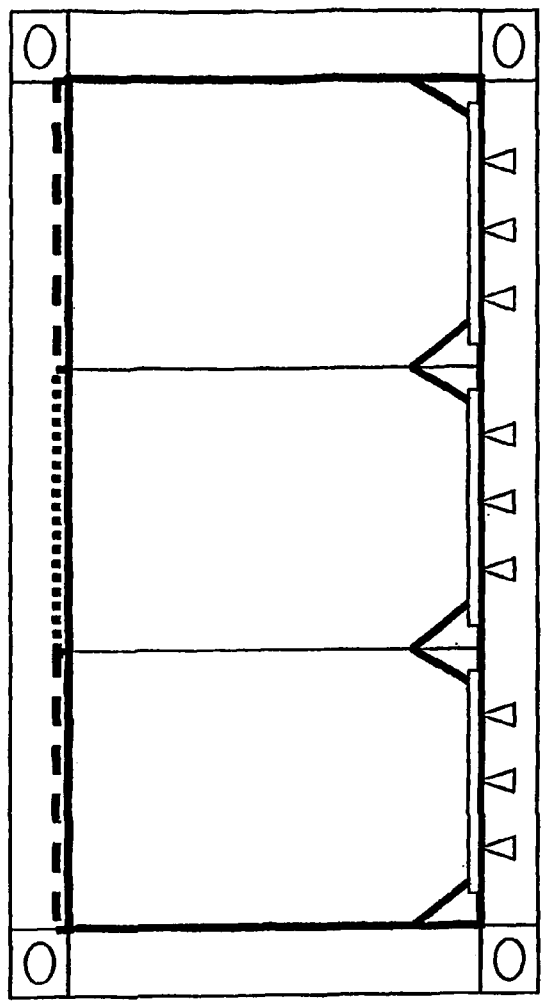
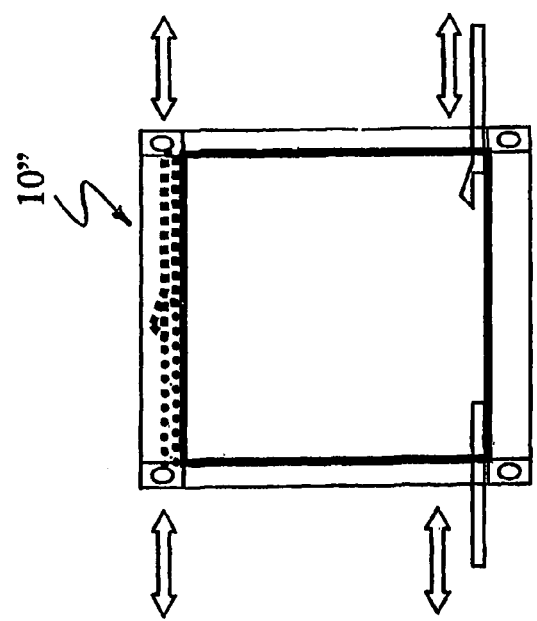
Fig 4b
Fig 4a

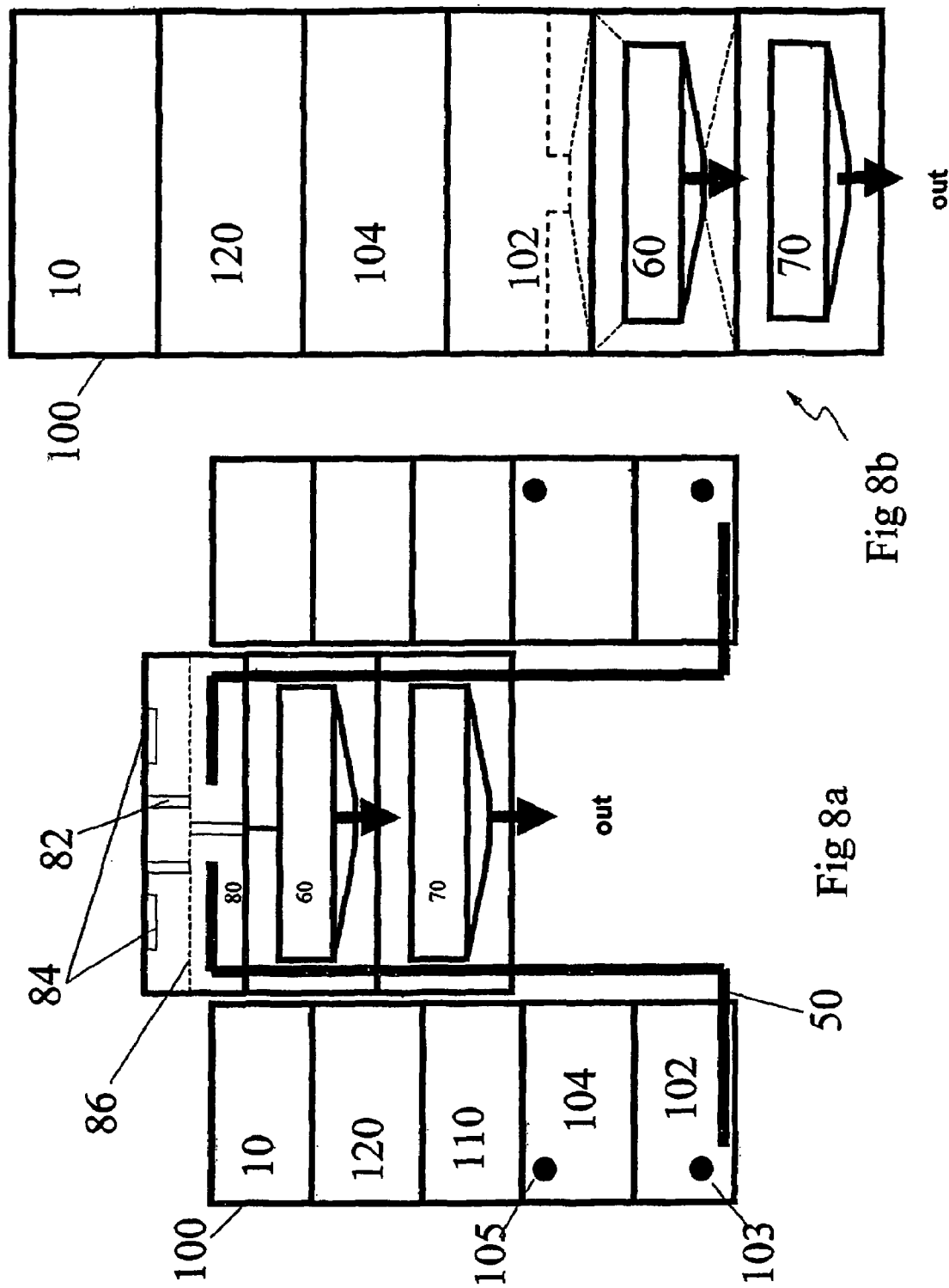

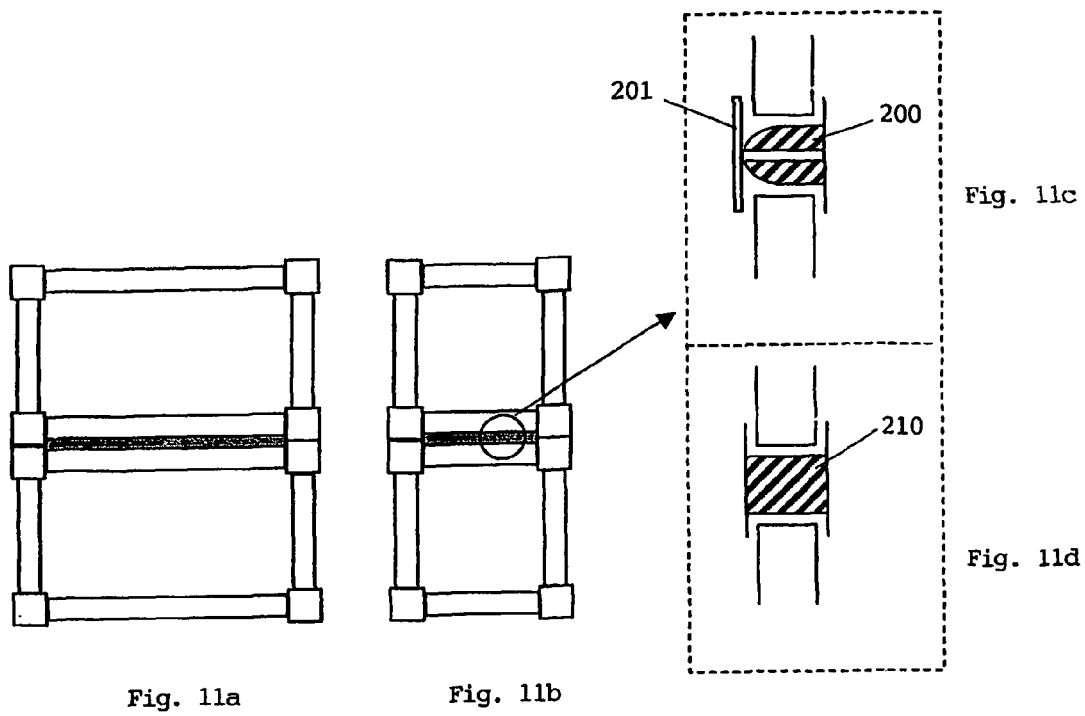
Fig. 11a  Fig. 11b  Fig. 11c
Fig. 11d
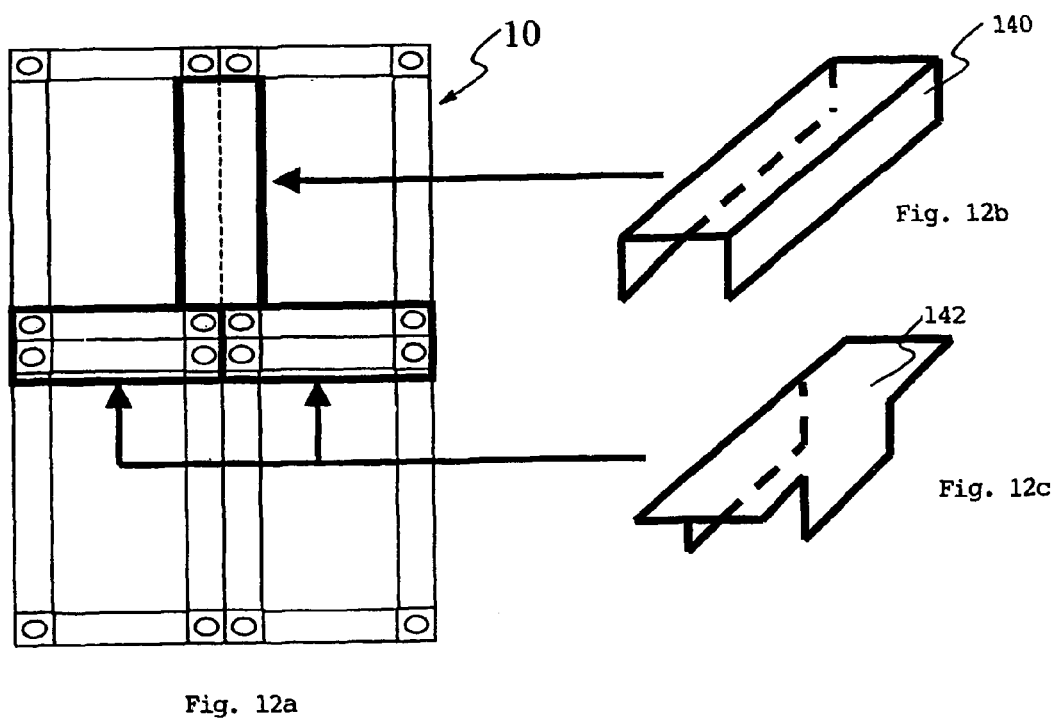
Fig. 12a  Fig. 12b  Fig. 12c

CONTAINERISED HANDLING OF BULK MATERIALS AND APPARATUS THEREFOR

FIELD OF THE INVENTION

This invention relates to containerised handling of bulk materials, for instance raw building materials. It also relates to stockpiling and batching of such materials using containers in general.

BACKGROUND OF THE INVENTION

Containers can be used to carry bulk materials, for instance raw building materials. However, one problem with this is that such materials are not always easy to unload. The containers tend to be tipped up from one end, so that the materials fall out of the other. However, this is not just a simple matter of tipping by a few degrees. Some materials require a tipping angle of over 45° to be fully unloaded. This requires tipping equipment and space and moreover can cause a lot of dust and mess.

An alternative to using a normal box container is to use a tank or silo container (with the tank in a container frame). The materials there are emptied through valves at the base. Whilst this may work for dry materials, it tends not to work for damp ones; the valves clog up.

The transportation of bulk materials is well exemplified by concrete. Concrete is a common construction materials and is a composite of cement, sand, gravel and water. The strength of cured concrete depends on the proportions of each component. Additives may be added to improve the fluid properties of the concrete during mixing and/or casting; others may be added to improve the hardness of the concrete after curing; colour pigments can also be added to give the concrete a distinct colour for a specific application, such as to differentiate the floor areas at a factory.

These raw materials are normally supplied in bulk by separate suppliers. For example, cement is manufactured only at a specialised plant, where limestone and large electric power are readily available and only at the locations approved by the environmental authorities. Similarly, gravels are produced at the quarries and the industry is also controlled by the environmental authorities. Sand may be dredged out from the sea or river bed. These raw materials are then transported to a batching plant. This may be at a construction site, but in many cases, there is no land available for an on site concrete batching plant or there may be other reasons why it is not feasible. In such cases, the raw materials are batched at a remote batching plant and transported to site by concrete mixers. This remote batching plant may have to occupy a large piece of land to stockpile the raw materials. In land-scarce countries, such as in Singapore, efficient use of land is a concern.

In many places, all the raw building materials are imported from the surrounding regions; gravel may come from one place with sand and cement coming from again different places. Typically, gravel and sand are transported by barges, while cement by specialised ship. At the landing point, these materials are stockpiled and then transferred to the batching plants or construction sites.

These batching plants and landing points are normally open facilities and the transfer of huge amounts of materials generates a lot of dust into the air. Abatement of dust pollution is therefore important.

Tipping of a container mounted on a truck tends to cause a lot of dust. Also tipping of a container suspended on a crane is not a safe practice. Shipping of wet sand and gravels in silo or tank containers does not work.

These problems necessitate a search for simpler and economical means of shipping and transfer of bulk materials and yet reducing pollution from the present levels.

SUMMARY OF THE INVENTION

This invention provides novel containers and, inter alia, an apparatus and system for containerised handling of raw building materials. These containers are handled at a container port and are stockpiled at the stacking yard. Sand and gravel (aggregate) can also be batched into mixer containers for stockpiling.

According to a first aspect of the present invention, there is provided a container for transferring bulk materials, being shaped, dimensioned in length and width and operable as a standard freight container and having a base, at least a portion of which is openable for discharging contents of the container therethrough.

The base or a portion thereof can be slidable, pivotable, hinged, swingable, displaced vertically, etc.

Preferably, the container has at least one compartment, the or each compartment having at least one lower section of reducing cross-sectional area, each leading to an opening, and a closure assembly for the or at least one opening, for releasing or retaining the compartment's contents. Moreover, the or at least one closure assembly is preferably pivoted.

According to a second aspect of the present invention, there is provided slewing apparatus for turning a container comprising:
  a supporting portion;
  a rotatable, container holding portion; and
  means for rotating said container holding portion on said supporting portion; wherein
  said container holding portion comprises:
  a base portion for supporting and fastening to the lower part of a container; and
  arm means extensible in a first direction and having fastening means with an extent in at least a second plane, orthogonal to said first direction, for fastening to the upper part of a container;
  wherein said fastening means is rotatable between a first position where it cannot fasten said container, whilst the container is supported and fastened to said base portion, and a second position, where it can fasten said container, whilst the container is supported and fastened to said base portion.

Preferably, when said fastening means is in said first position, a container can be placed for fastening to said base portion or removed therefrom, and, when said fastening means is in said second position, the fastening means obstructs a container from being placed for fastening to said base portion or removed therefrom.

Advantageously, the base portion may be arranged to support a container from below and said fastening means arranged to fasten to a container from above.

Preferably two such apparatus are used together, one for each end of a container.

A pollution control enclosure for use with the slewing apparatus is also provided.

According to another aspect of the invention, there is provided a system for producing a mixture of components, comprising:
  at least one stocking section having a stocking chamber for a component; and a scaling section for determining and delivering a scaled amount of each component;

and operable such that a container may be stacked on top of said stocking section for replenishing said component therein.

This system for producing a mixture of components, may further comprise a section for holding or blending the scaled components before discharging the mixture.

This could be by using a container as above or the slewing apparatus as above.

Preferably the system includes a pollution control section for use between at least said container and said stocking section for abating particulate pollution as material is discharged into the stocking section.

The stocking section, scaling section, mixing section and the one or more pollution control sections ideally are shaped, dimensioned, transportable and stackable as a standard freight container.

This system is advantageous for producing concrete.

BRIEF DESCRIPTION OF THE DRAWINGS

The present invention will be further described by way of non-limitive examples with reference to the accompanying drawings, in which:

FIGS. 2a-2e show containers having a hinged base plate in one or two parts, according to embodiments of the invention;

FIGS. 4a-4b show a container with both a base and top that can be opened;

FIGS. 8a-8g show a system for containerised handling of raw building materials at a concrete production plant, according to yet another aspect of the invention;

FIGS. 11a-11d show interfacial seals between stacked-up containers, according to again another aspect of the invention;

FIGS. 12a-12c show covers for preventing waste of raw materials according to yet again another aspect of the invention.

DESCRIPTION OF THE EMBODIMENTS OF THE INVENTION

Figure 1A:
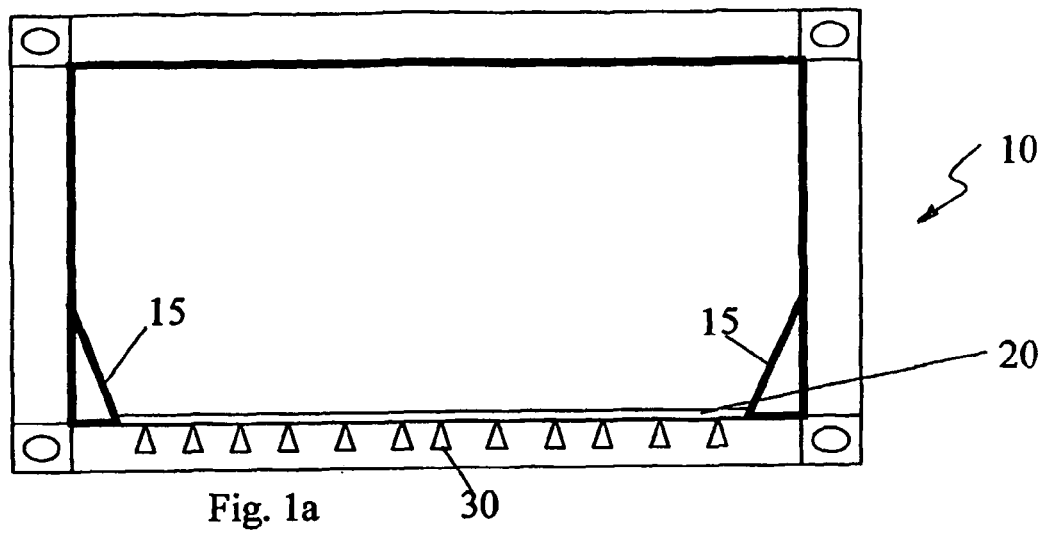
FIGS. 1a-1c show containers having a sliding base plate in one or two parts, according to one aspect of the invention.

FIG. 1 shows a container 10 with a single sliding base plate 20. This container 10 has the same or similar external length and width dimensions and corner castings as a regular freight container already in use, such as that of an ISO-type or SeaLand-type container. The height can be non-standard, although standard heights may be preferred. However, the base is different, allowing the base plate 20 to slide open. In this manner materials within the container can fall out of the bottom. The base frame of the container has support bars 30 supporting the base plate when closed and keeping it rigid under the weight of the raw materials. These support bars 30 are preferably pointed or curved at the top to prevent material settling on them when it falls.

Additionally, around the edges of the base plate 20, there are seals 15 to prevent material in the container getting around the ends and sides of the base plate 20 and escaping or clogging up the sliding action.

Figure 1B:
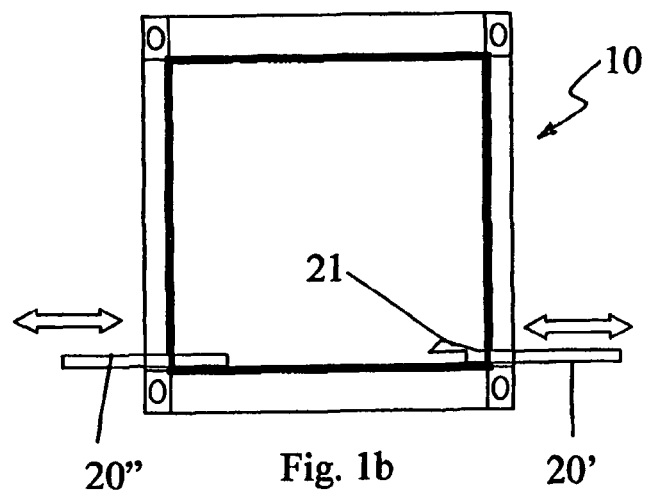
Figure 1C:
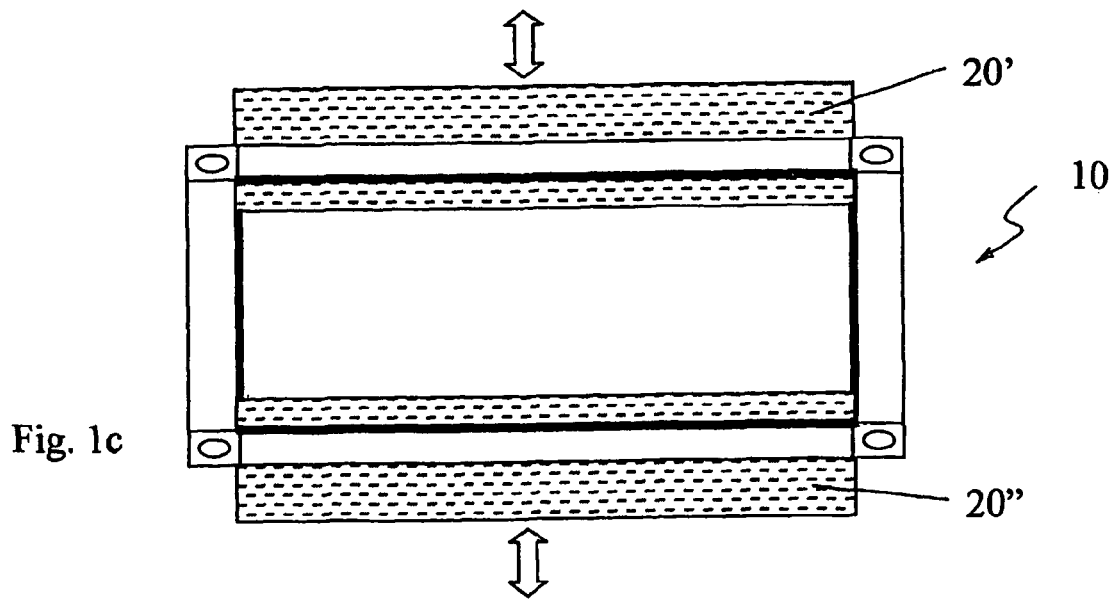

The base plate 20 need not be a single piece. It can be made of two pieces 20', 20" as shown in FIGS. 1b and 1c, preferably with an overlapping edge 21. This has the advantage that the opening of the base can be carried out from either or both sides, if and when space constraints require it. A single container can have two or more independently movable or immobile base plates along its length and/or its width. There may be containers where the split is not central and/or where one side is immobile.

In another embodiment of this invention, FIG. 2a shows a hinged base plate 22 instead of a sliding one. Preferably, this hinged base plate comprises two pieces 22', 22" as shown in FIG. 2b, with the pivot axes along the base struts of the container frame and the overlapping edges substantially mid-way in between. For a long container, such as a twenty-footer, it is possible to have the hinged base plates across the container in several sections 24 so as to ensure rigidity of the base (see FIG. 2c). It is also possible that a strut 31 be provided along the centre(s) of the base frame(s) of the container, in either the long or the short section. In this way, the moving edges of the base plates may abut the centre strut 31 offering more secure locking and releasing mechanisms and greater strength. The hinges may be located at struts 31 instead of the edge struts of the container (FIGS. 2d and 2e).

Figure 3A:
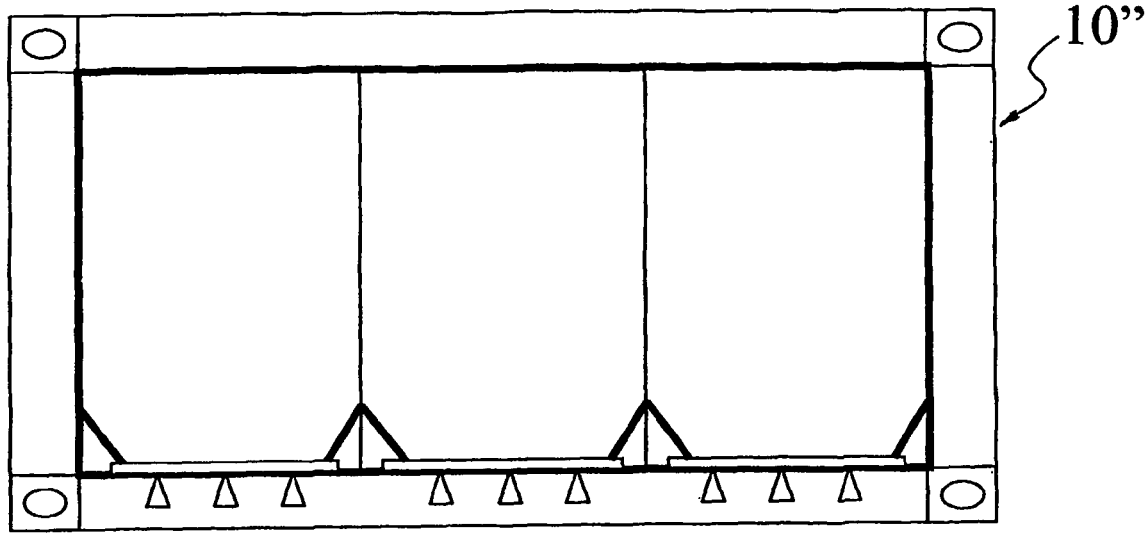
FIGS. 3a-3b show a compartmentalised container, being another embodiment of the invention.
Figure 3B:
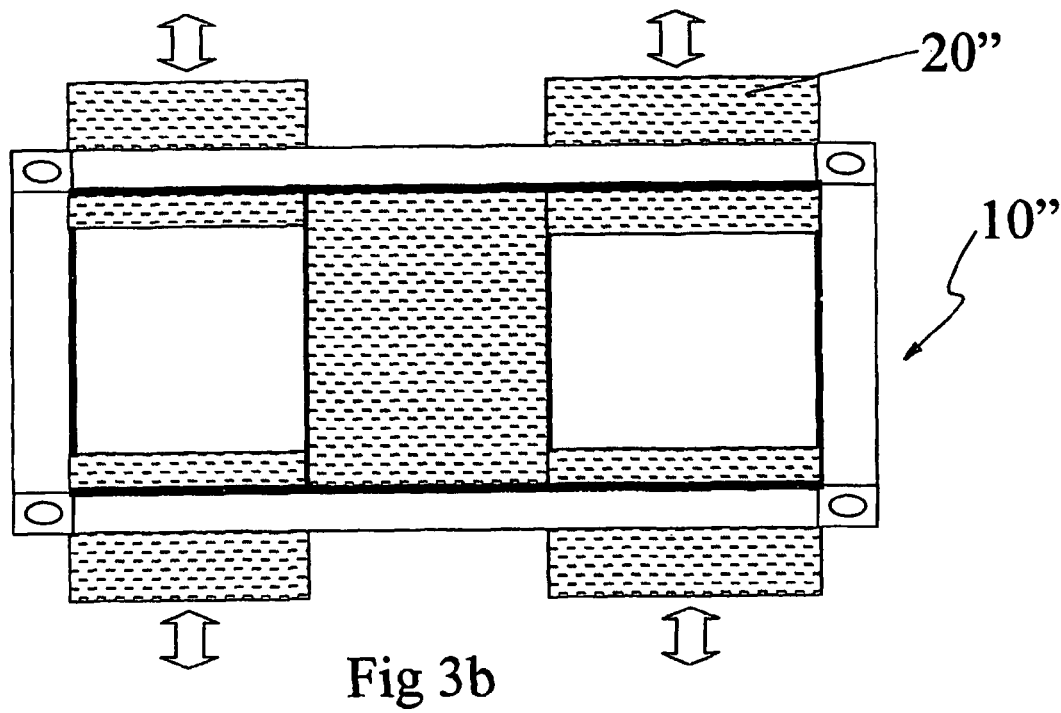

A further embodiment compartmentalises the container 10' to handle various raw building materials at the same time (FIGS. 3a and 3b). In this way, for example, sand and/or gravel (aggregate) can be batched into different compartments of a container. With this provision, it is possible to supply a container of sand and aggregate to a blending station to produce concrete with different structural strengths (having different compositions of sand, aggregate, cement and water). With prescaling of each batch of material, it is also possible to do away with the scaling station at a typical cement batching plant. Three compartments are shown but there may be any other number with compartments separated along the length and/or width of the container.

A further embodiment is shown in FIGS. 4a and 4b, which has a top that can be similarly opened. This feature allows easy loading whilst afterwards covering its contents, especially sand, and ensures that the moisture content is maintained during shipping or stockpiling.

The sliding action of the base plate (or sections of it) can be achieved by means of built-in hydraulic cylinders and a (remote) hydraulic power unit. This method is preferred for the large power that it can deliver, yet the cylinders are compact enough for installation below the base plate. With some compact control units, installed at an edge of the container for example, an operator can easily operate the cylinders to slide open the base plate. By operating different control units, different sections of the base plate can be opened. The cylinders and control units may be connected at least in some parts by flexible hoses that are in common use. The flexible hoses allow relative movement between the cylinders and control units thereby making the opening of the base possible. The control unit may be integrated with the power unit.

In the same manner, hydraulic cylinders, for example, may be used to release the catches of the locks for the hinged base plate or sections of it. Hydraulic power is preferred, due to its huge power, compact cylinders and control units, and flexible power lines. Additional hydraulic cylinders may be provided to enable closing of the hinged base plate. This is particularly useful when access to close the hinged base is not possible for safety reasons, for example.

The movable base plates are also provided with handles, which allow them to be pulled from outside, for example by a hook on a chain, a forklift. Other means, especially rotary means, such as a motor connected to a reduction gear set driving a rack and pinion assembly; or a winch and cable mechanism may be used.

It is also possible that the actuators (both linear and rotary) for operating the base plate (or sections of) of container 10, 10" are mounted in the structure on which container 10, 10" sits. In this case a projection at the moving end of the actuator engages with a catch on the lower side of base plate 20 (or sections 20" of it). The advantage of this feature is that only one set of operable mechanism is required at each material discharge point.

Figure 5A:
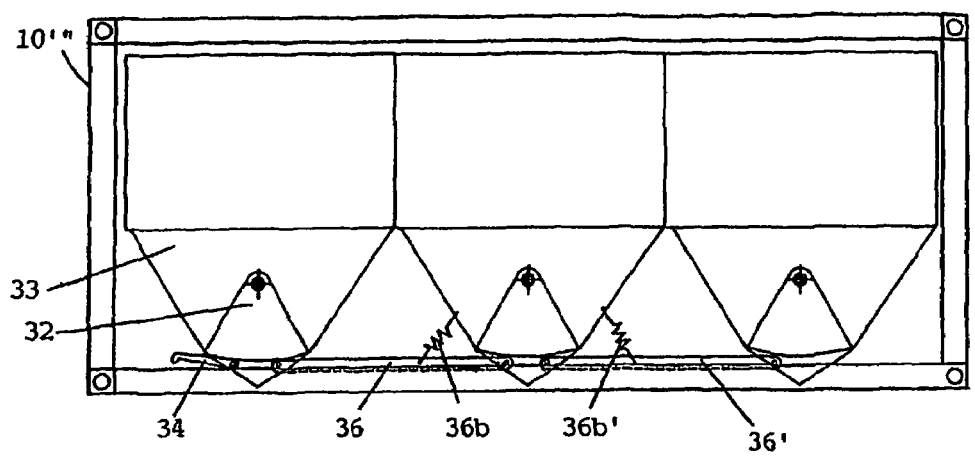
FIGS. 5a-5e show details of containers according to further embodiments.
Figure 5B:
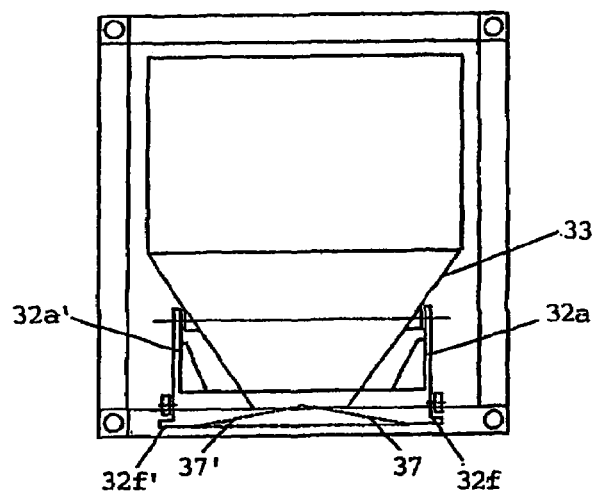
Figure 5C:
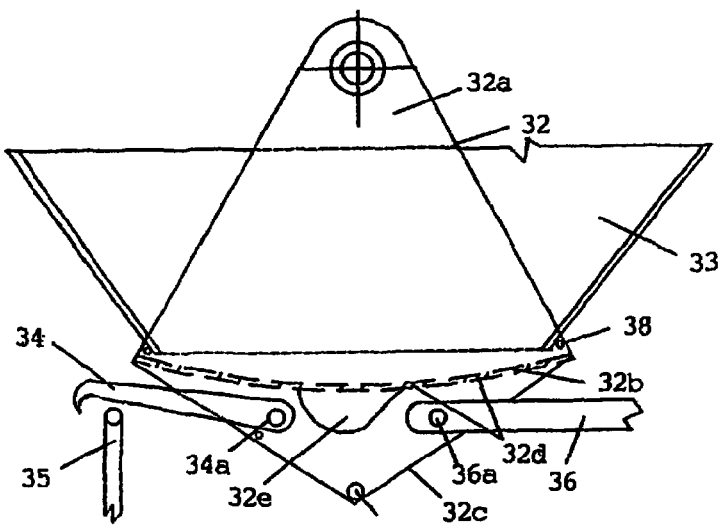

FIGS. 5a and 5b show yet another embodiment of a container for discharging its content through an openable base, the details of which are shown in FIG. 5c. The container 10''' is illustrated with three funnel portions in its lower part, which are sealed by operable pivoting base plates 32. Pulling a pivoting base plate 32 to one side allows the material in the container to fall out through the end of the funnel. In this embodiment, the three pivoting base plates 32 are interconnected, such that pulling one aside, pulls all three. However, in some other embodiments, especially where the container is compartmentalised, this would not be so. Of course there do not have to be three of these funnels and opening portions. There could be any number, from one upwards.

As can be seen from FIGS. 5a to 5c, each pivoting base plate 32, is made up mainly of two vertical end hinge plates 32a, one at each end, and an interconnecting base portion. The base portion has, as its upper part, an arcuate closure plate 32b. The centre of the closure plate 32b is its lowest part. Below this is a triangular support structure 32c. Two of the apices of the support structure 32c are common to the ends of the arcuate closure plate 32b. The third apex is below the centre of the closure plate 32b, this being its lowest point.

The main part of the closure plate 32b closes off the base of the funnel portion 33, thereby preventing material from passing out. The ends of the closure plate, however, extend beyond the edges of the funnel to ensure complete closure. Seals 38 on each side prevent materials slipping between the end of the funnel and the closure plate.

The vertical end hinge plates 32a are pivoted to the outside of the funnel 33, allowing them to swing to either side. In so swinging, the interconnecting closure plate also swings to one side, thereby opening the funnel. The arcuate shape of the closure plate is centred on the pivot axis of the end hinge plates 32a to allow it to swing past the edges of the funnel without allowing any material to get between them. However, this is not essential.

The end plates are shown as solid, but could mainly consist of bars around its edges instead. They are shown as hinged to the funnel 33, but could be hinged to the container walls or other struts. Funnels 33 are shown as narrowing in two orthogonal directions, but do not need to. They need only narrow in the direction of swing of the closure plate. In the other orthogonal direction they only need to allow the end plates to pivot outside them.

The closure plates are shown as being perforated. Perforations 32d allow water collected in container 10''' to drain out and maintain the moisture of the material. Below the perforated closure plate 32b is a filter material 32e, such as a sponge, for example. The filter material 32e allows water to pass through but keeps the material inside the container. Inside support structure 32c is a sloping plate 37. Plate 37 keeps filter material 32e in place and directs water to port 32f. FIG. 5b shows two sloping plates 37, 37' but may, for example, have only one sloping in one direction. A hose or pipe may be connected to port 32f to direct water beyond the container boundary, thus preventing water from the upper containers dripping into the lower containers.

The opening mechanism will now be described. A hook 34 is pivoted on support structure 32c at pivot 34a. Pulling the hook pulls the pivoting base plate 32. In order to open all the compartments of container 10''' at the same time, link bars 36 are provided between the individual pivoting base plates 32. These are pivoted on the support structure 32c at pivot points 36a. The pivot points 36a and 34a may well be common, if required. In addition, springs 36b, 36b' are provided between the funnels and hooks 34 and/or link bars 36 to return the pivoting base plates 32 to their closed positions.

A remote activation bar 35 below the container 10''' may be used to engage hook 34 when container 10''' is lowered to its discharge position. Its height is set to push the hook upwards during lowering, to pull the base plates 32 open, thereby opening the base of container 10''' and allowing its content to fall out. The height of activation bar 35 is adjustable. This allows for easy control on the opening of bases 32. Once the container 10''' is emptied and the container is hoisted up, bases 32 return to their closed position by gravity (and springs or other biasing means).

In order to reduce the load on the base 32, the area of the openable base should be kept low, whilst allowing the contents to be discharged in a controlled manner and within a reasonable rate. This also means that the base 32 should be of a reasonable size and mass.

Figure 5D:
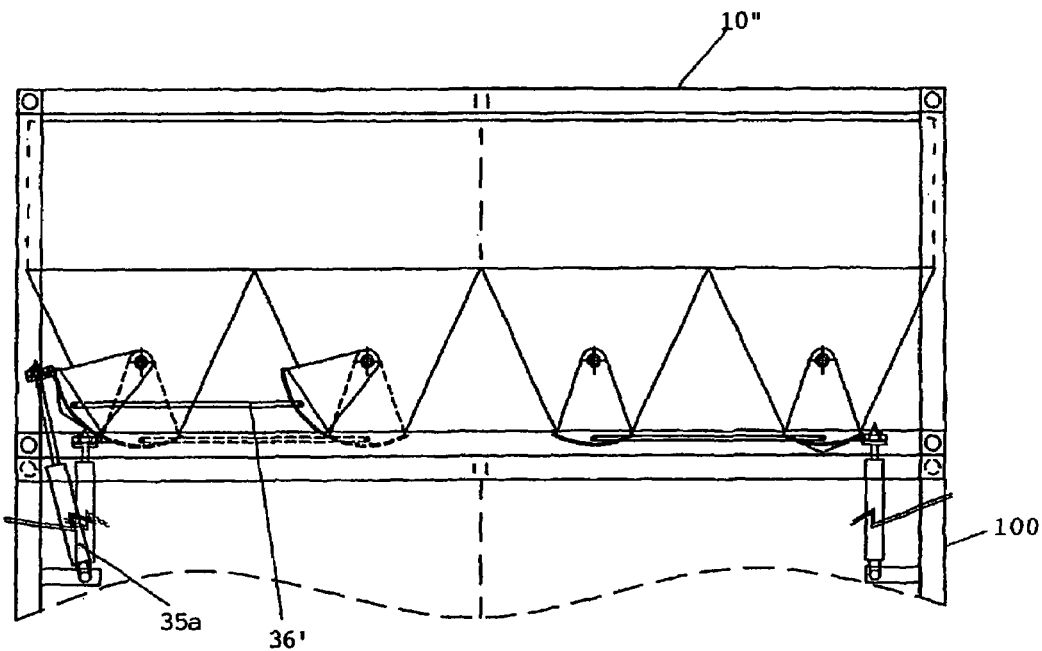

An alternative mechanism for opening the pivoted base plate 32 is to replace the remote activation bar 35 with an actuator 35a, such as a pneumatic or hydraulic cylinder as shown in FIG. 5d. Once the replenishing container 10" is placed at the material discharge point (which can be a container), actuator 35a is extended and engaged with the catch fixedly mounted on base plate 32, thereby turning it about its pivot and opening the base of the compartment of container 10". Link bars 36' may be used to link the base plates 32 of two or more compartments.

Figure 5E:
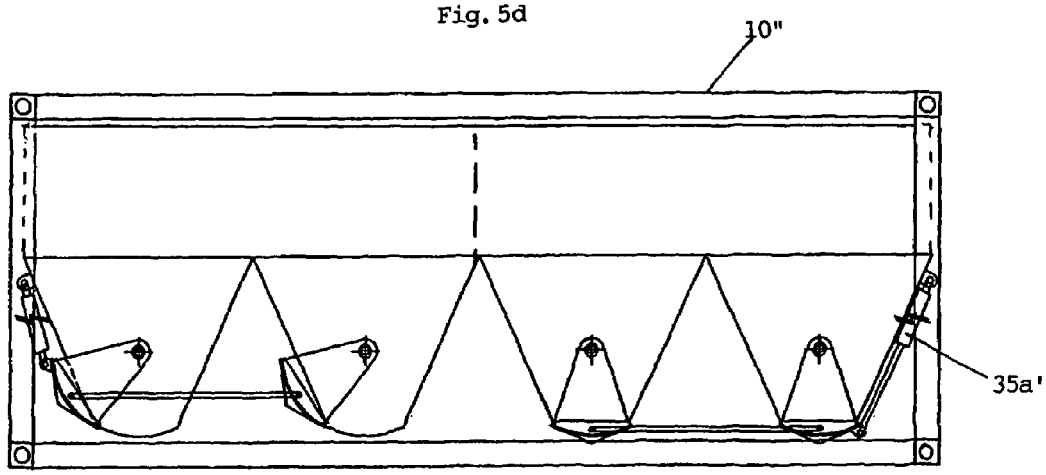

A variation of the opening mechanism is to mount the actuator 35a' directly to container 10" as shown in FIG. 5e. This may be useful such as when the lifting facility has limited headroom.

Figure 6A:
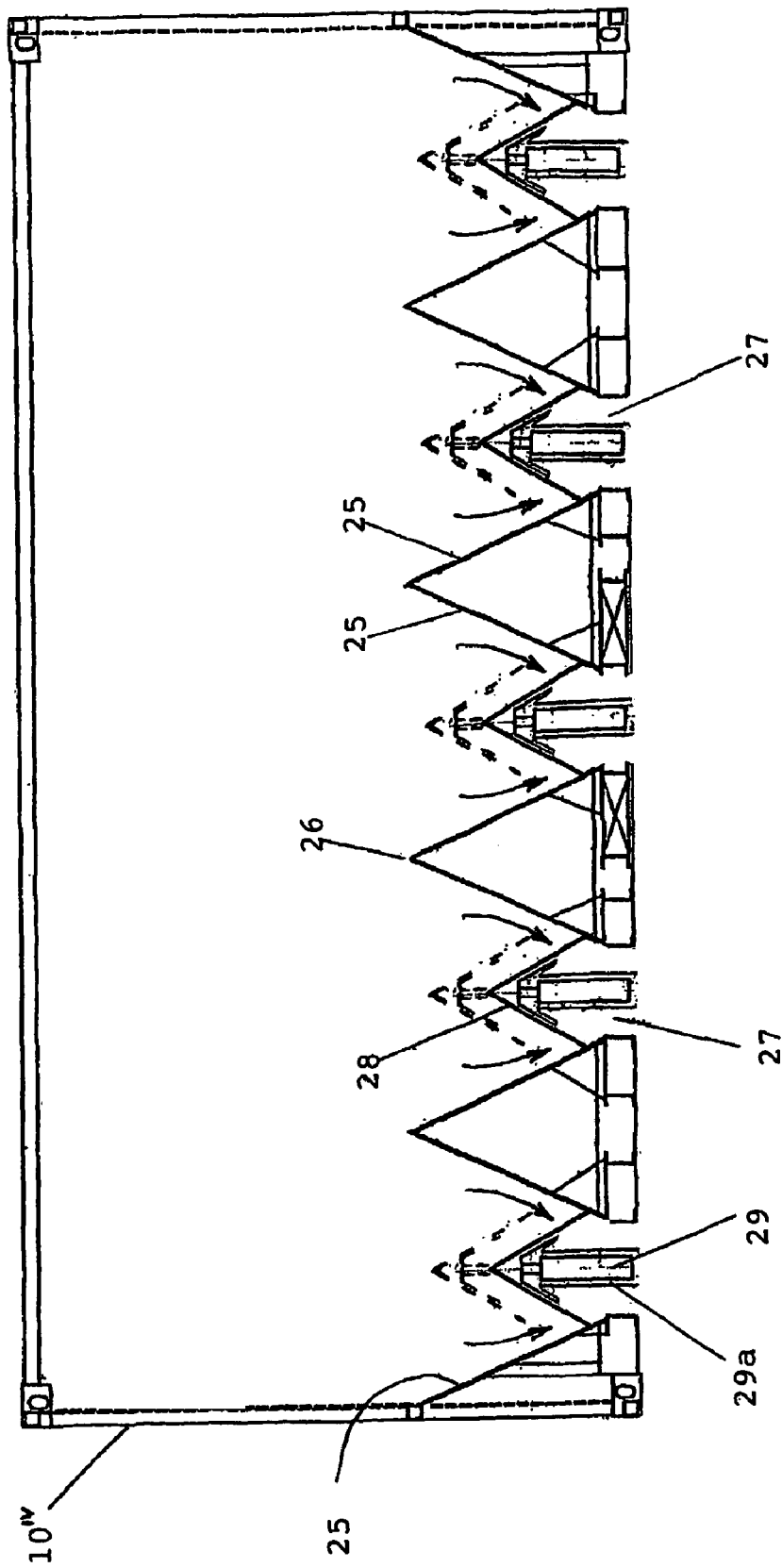
FIGS. 6a-6f show details of containers according to yet more embodiments.
Figure 6B:
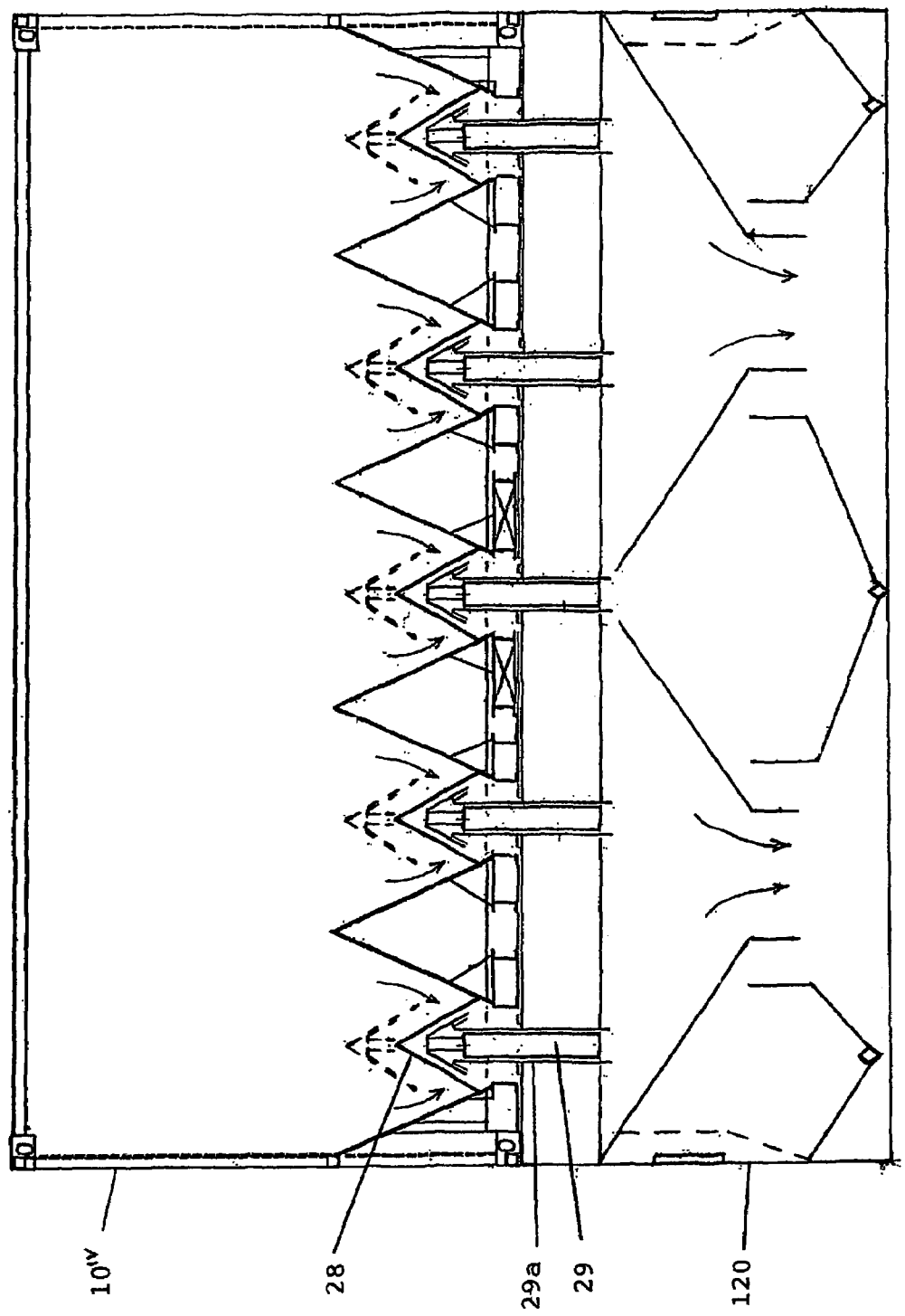

FIGS. 6a and 6b show yet another embodiment of a container 10" for discharging its contents through an openable base. As illustrated in these figures, the base of the container comprises a plurality of paired inclined plates 25 extending across the base of the container and spaced apart from each other. These plates 25 slope at an angle of between 20 and 60° to the vertical. They are joined at the upper edges, forming triangular shaped sections 26 across the width of the container. The spaces between each pair of these sections 26 form discharge chutes 27 through which the contents are discharged. At each end of the container is another inclined plate 25 whose upper edge is joined to the end wall and the lower edge joined to the base. These inclined plates 25, together with the nearest inclined plates of adjacent sections 26 also form discharge chutes 27.

The discharge chutes 27 are kept closed by means of triangular-shaped covers 28 extending across the width of the container. These covers 28 are substantially symmetrical about the vertical. This profile ensures that the flow of the content creates equal opposing dynamic lateral forces on both sides of a cover, and this ensures that each cover 28 is located at the centre of the discharge space 27. The symmetrical sides of covers 28 also ensure that the lateral components of the weight of the content on the cover are balanced whilst the vertical component induces self-closing of the covers.

FIG. 6a shows actuator means 29 installed vertically in the space directly below covers 28 and part of the container. These actuators are operable to extend vertically for pushing or lifting the covers from their closed position and allowing the contents to discharge through the space between the covers 28 and the inclined plates 25. These actuators are connected to direction control valves by pipes conveying the compressed fluid, either pneumatic or hydraulic. These controls (not shown in the figure) are conveniently installed in the void space below the triangular sections 26 and are accessible from a side of the container. Of course, a plurality of the actuators may be linked together and are operable as a group from a control valve. Additional set(s) of control valves may be provided at opposite sides of the container for the ease of operation.

To prevent wear and tear on the actuators 29 due to the flow of the materials discharging from the base of the container, there may be provided a sacrificial cover 29a around each actuator. This sacrificial cover 29a can then be replaced at regular intervals as and when necessary.

FIG. 6b illustrates the opening of covers 28 in another embodiment when the container is lowered on top of a pollution control container 120 (shown in FIG. 8a or 8b) for discharging its content therethrough. In this embodiment, the actuators 29 do not form part of the container but are located as part of or in addition to the pollution control container 120, at a material landing or discharge site. Similarly, the control mechanisms, such as the pneumatic or hydraulic lines and direction flow control valves are also located with the pollution control container 120. This helps to reduce the hardware cost of a container of this embodiment.

Each actuator in FIG. 6a or 6b need not be controlled by a separate control mechanism. They can be linked up in parallel, or even in series depending on the actuators used. Of course, the number of actuators or control mechanisms is not a limitation.

Figure 6C:
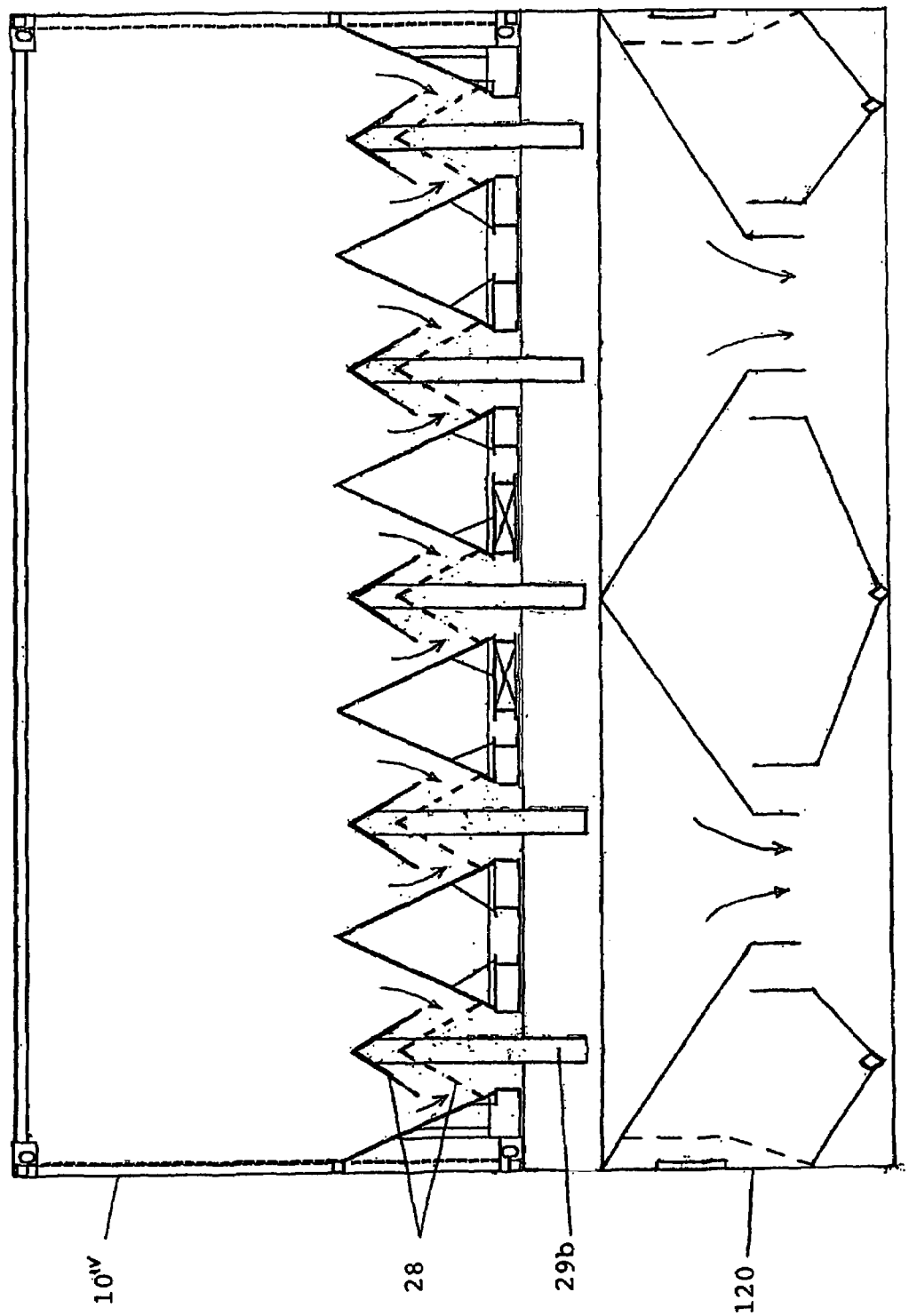

FIG. 6c illustrates another embodiment and the opening of covers 28 with the use of fixed activation bars 29b installed on the pollution control container 120, instead of an extensible piston means. Thus the act of lowering the container causes the discharge chutes to be opened.

It is noted that installation of these actuators 29 or activation bars 29b are not confined to the pollution control container 120. They could be similarly installed elsewhere, such as on a stock container 104, 110 or discharge container 102 (as described later in FIG. 8) depending on the apparatus adopted for each material handling facility.

Figure 6D:
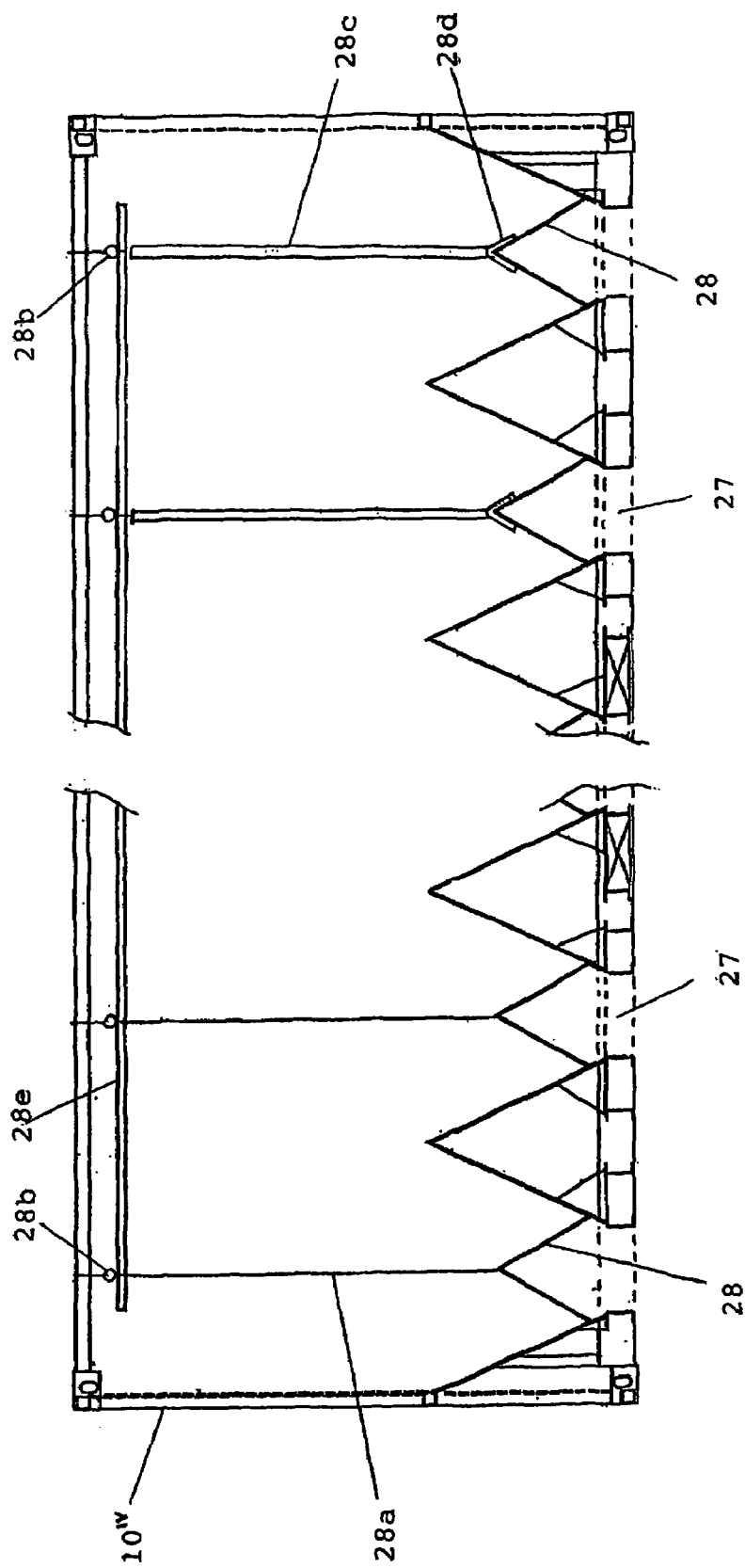
Figure 6:
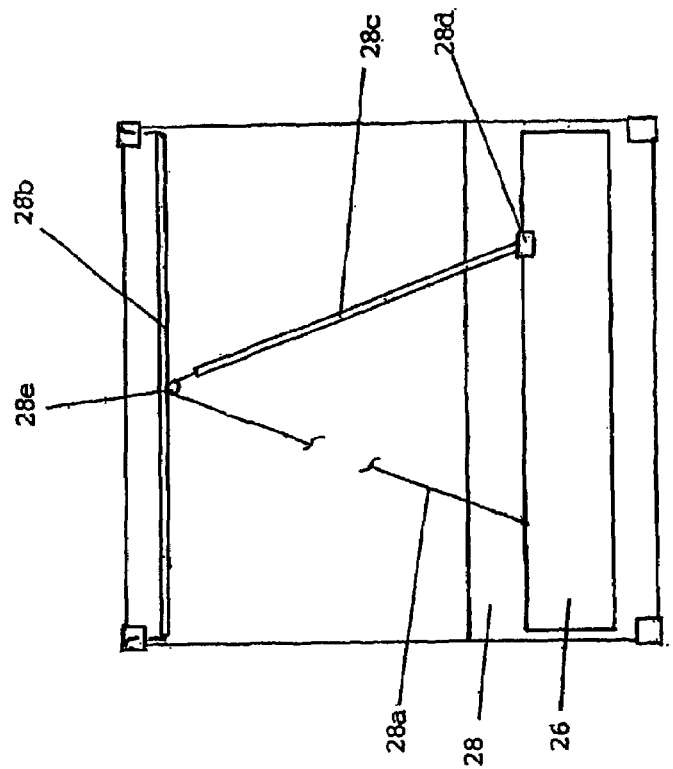
Figure 6:
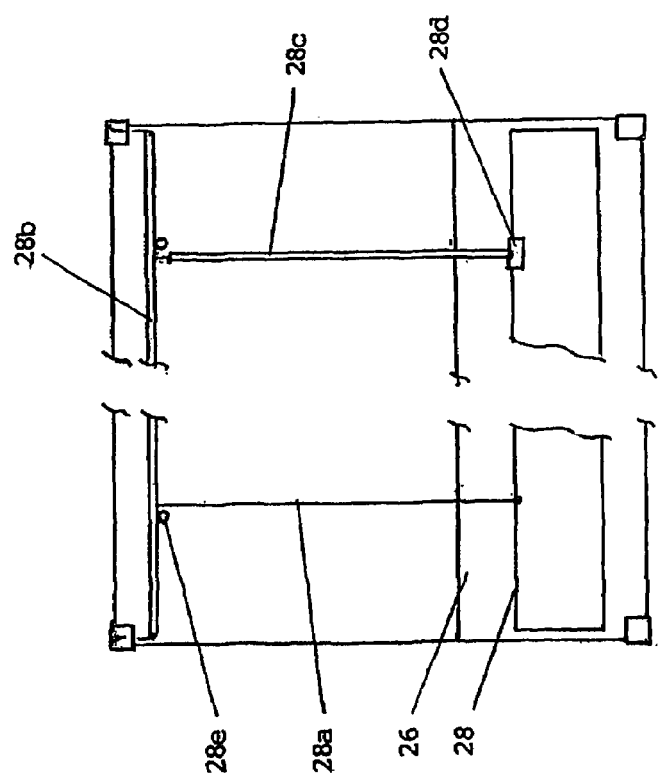

FIGS. 6d and 6e illustrate yet another method of opening covers 28. As shown in FIG. 6d, the top edge of cover 28 has two points spaced apart from each other, to each of which is attached an end of a rope 28a. The other end of each rope is attached to a cross bar 28b moveably positioned across the container near the top. The ends of the cross bar 28b have hooks for engaging the top edge of the container. Engaging the cross bars 28b, for example using additional hooks from the lifting equipment, and hoisting them up a distance pulls the covers 28 up, thereby opening the chutes to discharge the contents of the container. A pair of sliding guides adjacent the upper edge of the container, or other suitable means for allowing the repositioning of each cross bar 28b after they have been lifted, may be provided instead of hooks.

To prevent wear and tear on the ropes, a sacrificial pipe 28c is provided around each rope 28c. At the base of pipe 28c is attached a V-shaped plate 28d. This V-shaped plate 28d fits onto the upper edge of cover 28 and provides additional support for the pipe or rope.

The cross bars 28b are linked to each other by means of a pair of lengthwise bars 28e so that hoisting the lengthwise bars 28e at either two or four points is sufficient to pull all the covers 28 up and open the discharge chutes 27. Alternatively, a single bar 28e is provided at the centre of 28b linking all the cross bars 28b together and two hook engaging points on 28e may then be used for opening all of the covers 28 simultaneously.

Variations of this embodiment are also possible. A variation is to provide covers with other cross-sections, for example, a partial cylindrical section. Another variation, as shown in FIG. 6f, is to provide a slanting rope with each end attached to each of the two attachment points on cover 28 with the centre part of the rope going over a single cross bar 28e. In order to help locate cross bar 28e at the centre of the container, at least two cross-bars 28b are provided near the two ends of the container. Sacrificial pipes may be provided here too around the ropes for reducing direct wear and tear of the ropes and indirectly the maintenance cost. Another variation is to do away with the rope but to use the sacrificial pipe or some other link, for example, a cable or chain, for lifting the covers 28.

Figure 7A:
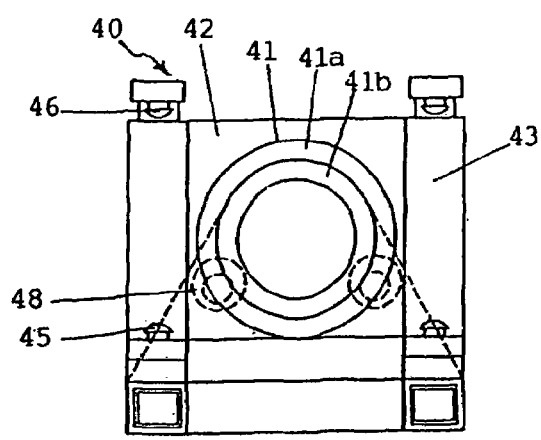
FIGS. 7a-7c show a slewing apparatus for a container according to another aspect of the invention.
Figure 7B:
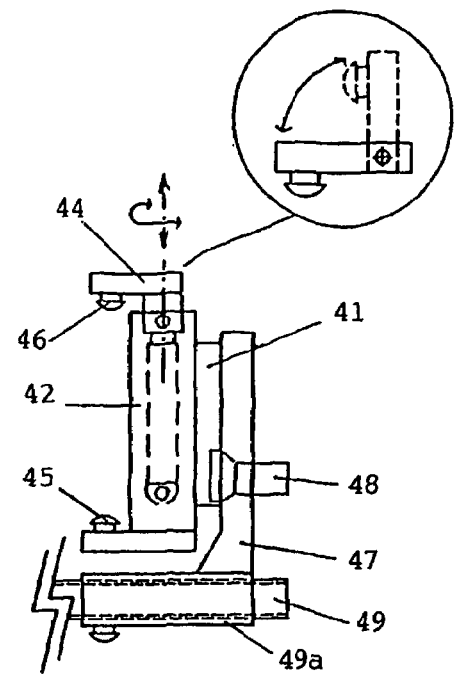
Figure 7C:
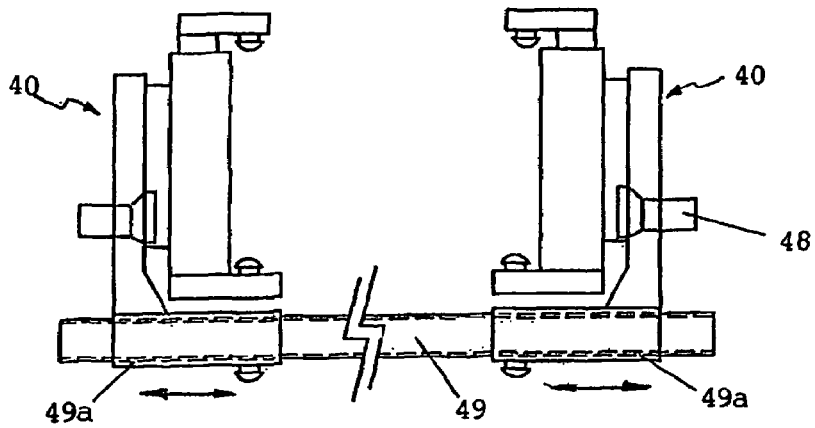

Another aspect of the invention is shown in FIGS. 7a-7c. In this aspect, open top or opened top containers are discharged by turning them upside down using a slewing apparatus 40.

A support structure 47 rotatably mounts a slewing structure 42, using a slew ring 41. An outer ring 41a of slew ring 41 is fixedly mounted on the slewing structure 42. An inner ring 41b of the slew ring 41 is mounted on the support structure. A motor, gearbox and pinion assembly 48 is mounted on support structure 47 for turning slew ring 41a. Depending on the turning torque required, additional drive assembly may be provided.

Slewing structure 42 has a base portion with twistlocks 45 for supporting and affixing to the lower corner castings of a standard freight container. It also has two vertically operable hydraulic actuators 43 at its sides for adjusting the heights of two vertically movable clamping supports 44. The tops of these supports 44 have twistlocks 46 for affixing to the upper corner castings of a standard freight container, for clamping it against the base portion. The upper twistlocks 46 are on arms which can rotate about vertical axes in the vertical portions of the clamping supports 44. They can be turned through 90° to become clear of the container to be handled. This allows the container to be loaded vertically onto the slewing structure 42. The angle of rotation could be slightly less or could be more, even allowing 360°. The axis could even be horizontal to allow the arms to pivot in a vertical plane.

The clamping supports 44 and upper twist locks 46 can also or alternatively pivot about a horizontal axis between first and second positions. In the first position support 44 is in a horizontal position with twistlock 46 directed downwards. Support 44 can also swing upward to its second position and become clear of the way for a supply container to be lowered vertically. Once the lower twist locks 45 have engaged with the lower corner castings of the container, the supports 44 and upper twist locks 46 are moved back to their first positions. They are then lowered by retracting actuators 43 before engaging with the upper corner castings. These operations can also be simultaneous or ordered in other ways.

When a container is locked onto the slewing structure 42, the slew ring 41 is rotated to turn the slewing structure 42 and container through substantially 180° to empty out its contents. It can then return to its upright position back through the 180° it came or through the remaining 180°.

Support structure 47 can be mounted on the ground, on a trailer, on a forklift or on other suitable structures or vehicles.

As full containers can be very heavy, the preferred embodiment has two such slewing apparatuses 40, one for each end. A preferred arrangement is shown in FIG. 7c, where two slewing assemblies 40 are mounted on a guide rail 49 to allow for variations in lengths of containers. Although both are shown as being at adjustable positions, only one needs to be adjustable or on the rail.

FIG. 8a illustrates a containerised batching plant where various components are batched together in bulk, for instance for concrete. Each type of raw material used has its own feeding stack 100, which comprises an assembly of containers stacked on top of each other. The bottom, discharge container 102 has an outlet chute 50 through which the material is transferred by a feeder, for example a conveyor, to a scaling station 60 before it is blended with other components in a station 70. From there it may be loaded into a mobile mixer or other container. Station 70 may be a mixing device and/or a stock holding device.

Depending on the amount of stock of material required, there is at least one stock container 104, 110 stacked above the discharge container 102. For purposes of automation, a minimum material level sensor 103 is provided near the base of the discharge container. Two stock containers 104, 110 are shown. The three containers hold a stock of the relevant material. Near the top of the stock container(s), is a material level sensor 105 for detecting the upper limit of the material stock.

FIG. 8b shows a container 10 full of relevant materials on the top of the stack 100. It empties downwards into a pollution control container 120 which itself empties into the top-most stock container 104. A retractable vibrator may be connected to the outside of the supply container 10. This is used as and when necessary, for example when the sand is wet and it is difficult for it to begin to fall by gravity or to minimise the amount of wet sand remaining on the inside surfaces of the supply container.

The opening mechanism may be any shown earlier, e.g. a movable base or by tipping the container upside down, using the slewing mechanism described earlier.

Figures 8C, 8D, 8E:
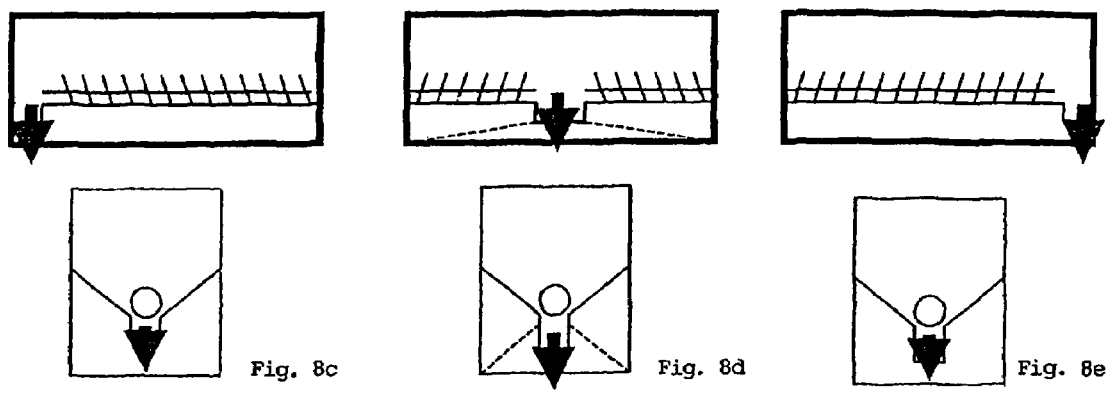

Discharge container 102 is exemplified by the different embodiments of FIGS. 8c-8e. Each drawing shows a side view of the container and an end view. In each case the contents of the container are moved to a discharge point by at least one screw.

Figure 8F:
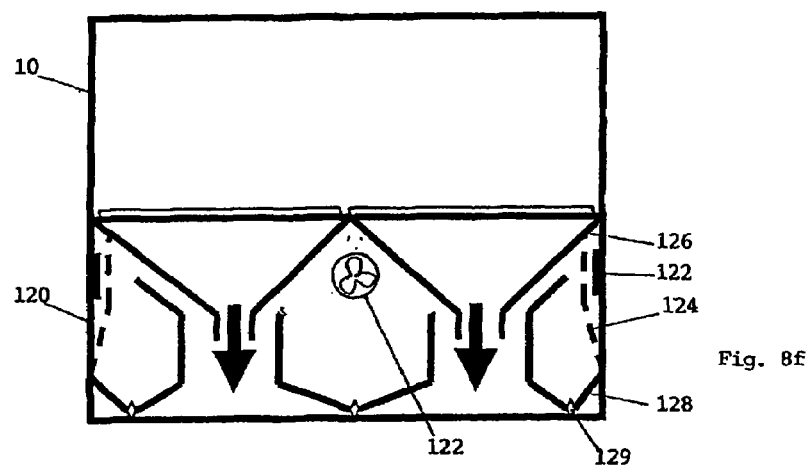
Figure 8G:
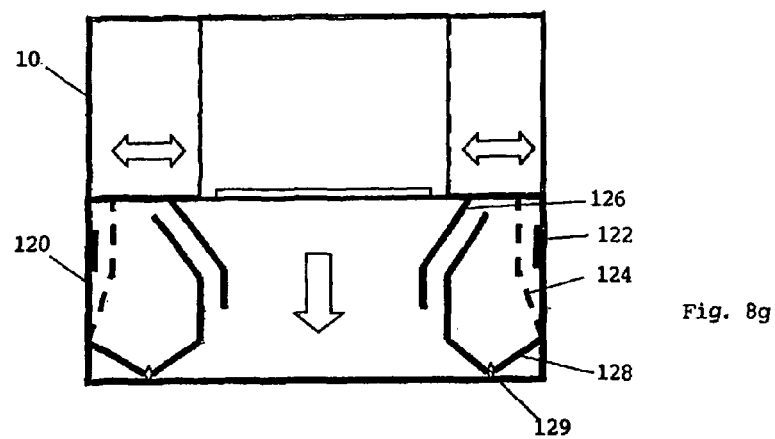

The pollution control container 120 is shown in more detail in FIG. 8f. It is illustrated with two funnels 126. These collect and direct the material falling into this container from above. Below and to the sides of the funnels 126 are a plurality of exhaust fans 122. Separating each fan from the inner chamber of the container is a filter 124 for catching fine dust particles in the exhaust air when the raw material is released into the feed stack from container 10. The undersides of the funnels 126, above the exhaust fans and filters act as diverting shrouds for creating venting spaces for the fans and filters. Below each filter section is an enclosure 128 to trap dust particles that accumulate and fall off the filter. On the bottom of each enclosure is a valve 129 for periodic removal of the accumulated dust. This aspect of the invention provides for an abatement of dust pollution inherent in this industry.

The fans 122 have a controller to operate them in switchable bi-directional rotations. For normal pollution control during the material discharge process, the fans 122 are operated as exhaust fans with the impellers rotating in the first direction. To clear the dust adhering onto the filter and forcing the dust particle to collect in enclosure 128, the fans are operated as blowers with the impellers rotating in the reverse direction. With this feature, the filter is operated with higher efficiency. Unnecessary machine breakdown due to filter choking is avoided. This filter cleaning process may be carried out periodically using automatic and interlocking control. Additional vibrating means connected to the filter can also be used to improve the filter efficiency.

The funnels in the pollution control container may divert the flow of materials to different storage points when a compartmentalised container 10", 10''' is used to supply different components.

Above the stations 60 and 70 is another pollution control container 80, as shown in FIG. 8a. As with the pollution control container 120 described earlier, there is a plurality of exhaust fans 84 with a filter 86 separating the fans from the other chamber of the container into which the raw materials are conveyed through chute 50. Above the filter and near the top centre of the container, there is a plurality of anti-choke cylinders 82. These cylinders are operable to shake off the dirt on the filter to prevent the filters from being clogged up and become non-functional.

Depending on the reachable height of the handling facilities at the batching plant, the feed stack 100 (comprising at least one stock container, a pollution control container and the material supply container) may be mounted directly above the stations 60 and 70. This is illustrated in FIG. 8b.

Figure 9A:
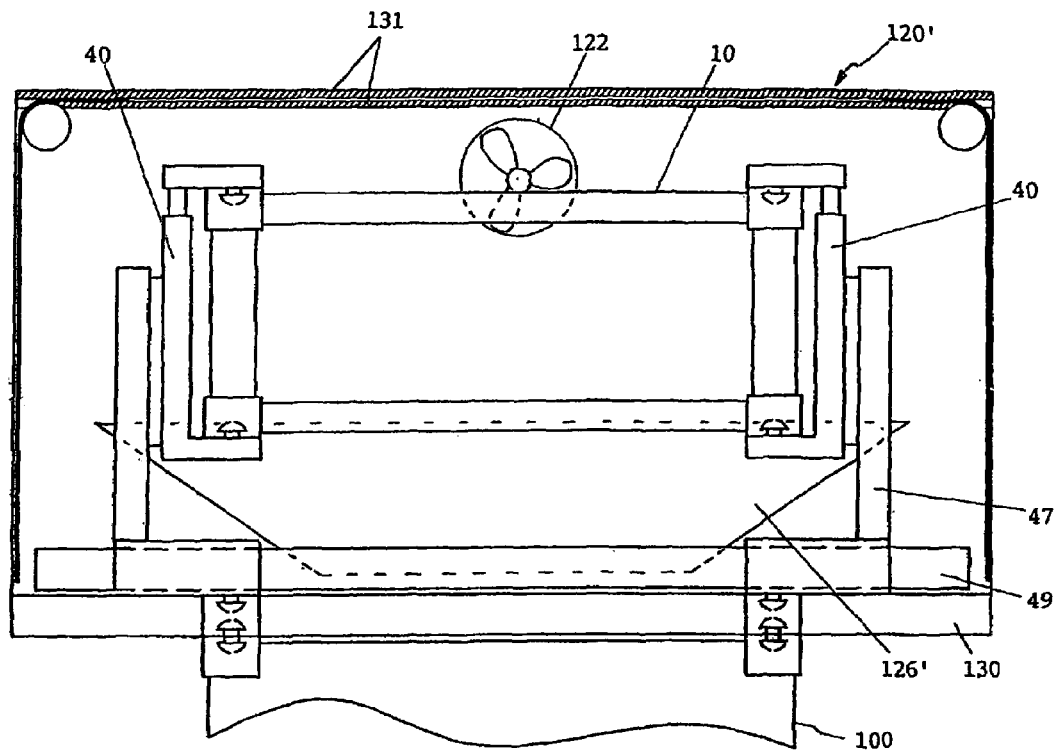
FIGS. 9a-9c show a pollution control enclosure for a slewing apparatus.
Figure 9B:
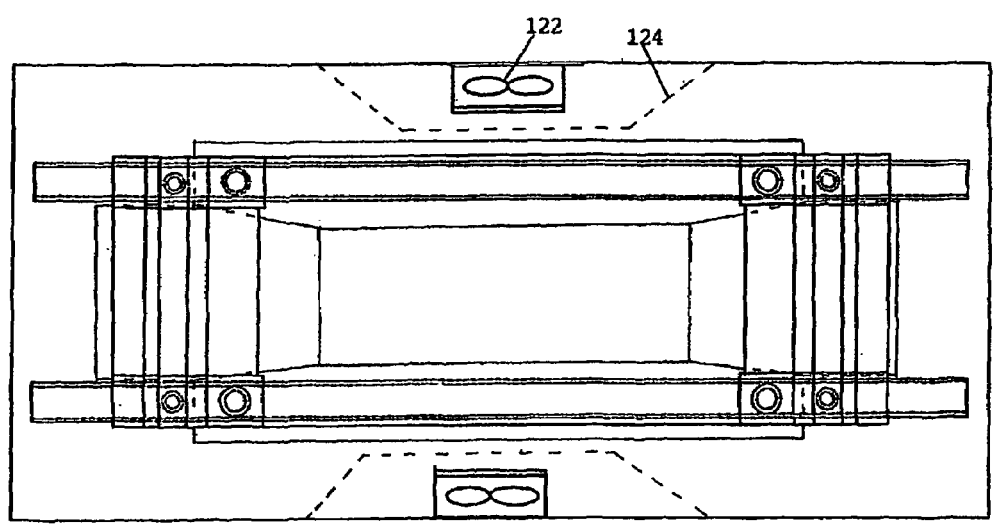

A pollution control container 120' for use with the container slewing apparatus 40 described earlier is illustrated from the side in FIG. 9a and from the top in FIG. 9b. This container 120' is larger than standard containers. However it is balanced such that it can stack on top of them and has twist locks suitably positioned for that purpose. It is shown stacked on top of stack 100.

Figure 9C:
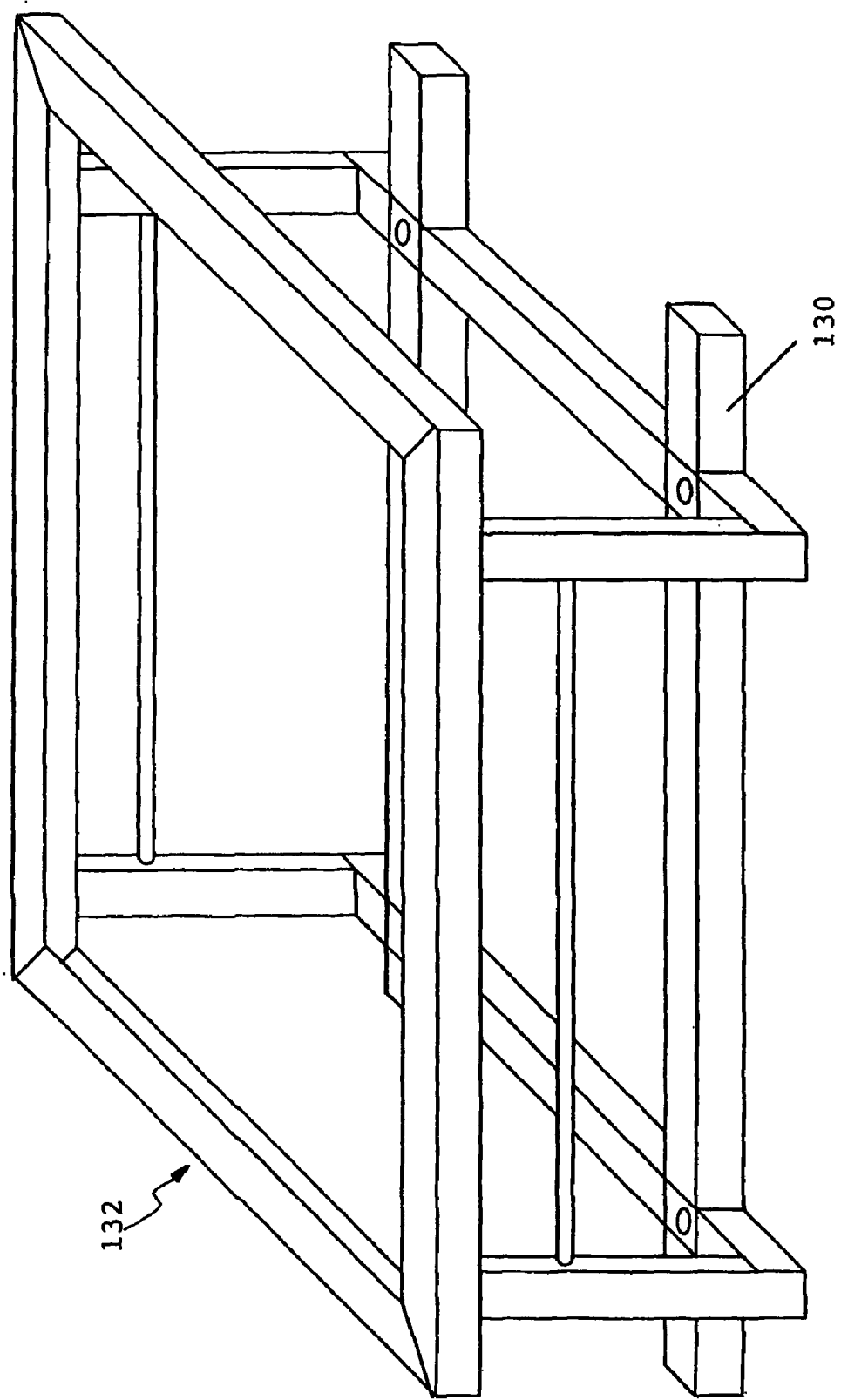

As in the other pollution control container described earlier, there is a plurality of fans and filters. Funnel 126' is used to divert the falling materials into the container below, such as the stock container 104 or other containers in stack 100. This pollution control container 120' has a large frame 132, which is shown in full in FIG. 9c, and encloses a pair of slewing apparatus 40, mounted on a guide rail 49. This is mounted onto the base 130 of frame 132 by means of twist locks. 120' also has retractable covers 131 at the top. These are closed when a supply container is loaded onto the slewing apparatus for it to be overturned and the contents discharged. In this manner, the dust created is contained inside 120' and the filters trap the dust particles from polluting the environment. As with the other pollution control containers, the fans' rotation may be reversed periodically to clear the dust particles from clogging up the filters. Additional vibration means may also be used to improve the filter efficiency.

Figure 10:
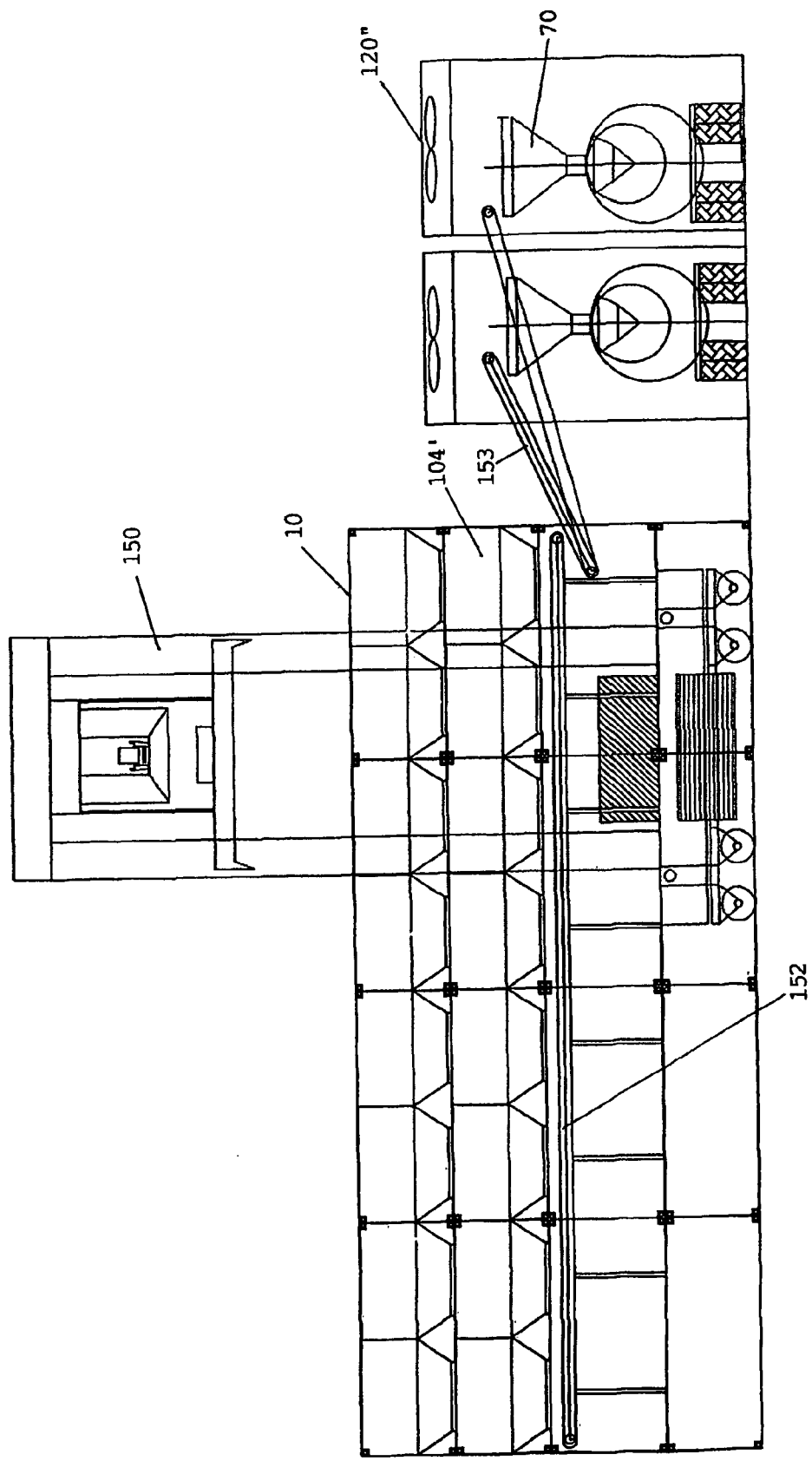
FIG. 10 shows another system for containerised handling of raw materials at a concrete production plant.

FIG. 10 shows yet another embodiment of a material feeding stack. A transtainer 150 moves along a set of rails and loads/unloads the material supply containers 10 onto/from on top of stock containers 104'. This transtainer 150 has a finite working height. In this case, the pollution control features of 120 are integrated into the upper part of stock container 104'. Below container 104' is a scaling conveyor 152 for feeding the right amounts of the different material components to a link conveyor(s) 153 for discharge into station(s) 70.

Each station 70 is enclosed in a pollution control enclosure 120". As with the other pollution control features, there may be a plurality of fans and filters for reducing dust pollution. Additional vibration means may also be provided.

In accordance with the requirements of standard freight containers, they are stacked on top of each other with only the corner castings of one container in contact with those of the other container. This means that the interface between containers is open and dust pollution can emanate from or enter into the interfacial gaps. Therefore portable seals are provided to ensure that this pollution control means is effective. FIGS. 11a-11d illustrate the use of the seals 200, 210. In the case of seal type 200, these can be inserted from one side once the containers are in situ. Seals 200 are secured in position by means of rotatable locks 201. These locks may be spaced at regular intervals, for example every 0.6 m. In the case of seal 210, these must be placed on a lower container before an upper container is placed.

Containers are usually filled with raw building materials using rather messy bulk transfer, eg. by means of conveyors, clam shell bucket and cranes; shovel and tractor, etc. During such filling processes, raw materials unavoidably fall in between the containers. This is wasteful. Further, when this process is repeated several times it leaves mounds of material which make placing of the containers awkward and need removing. To minimise accumulation of materials, a cover 140, as shown in FIGS. 12a and 12b, is used. This clips containers together along their edges, with one cover covering two adjacent lengths, sides or other edges, thereby preventing material falling between them. A different cover 142 is used to cover adjacent edges and corner castings. Otherwise the material may fall in there too and make it difficult to lock them properly. Between them covers 140, 142 can be used for every adjacent edge. For instance, along the top, several of cover 140 can be used along an adjacent length, depending on the lengths of the containers.

Figure 13:
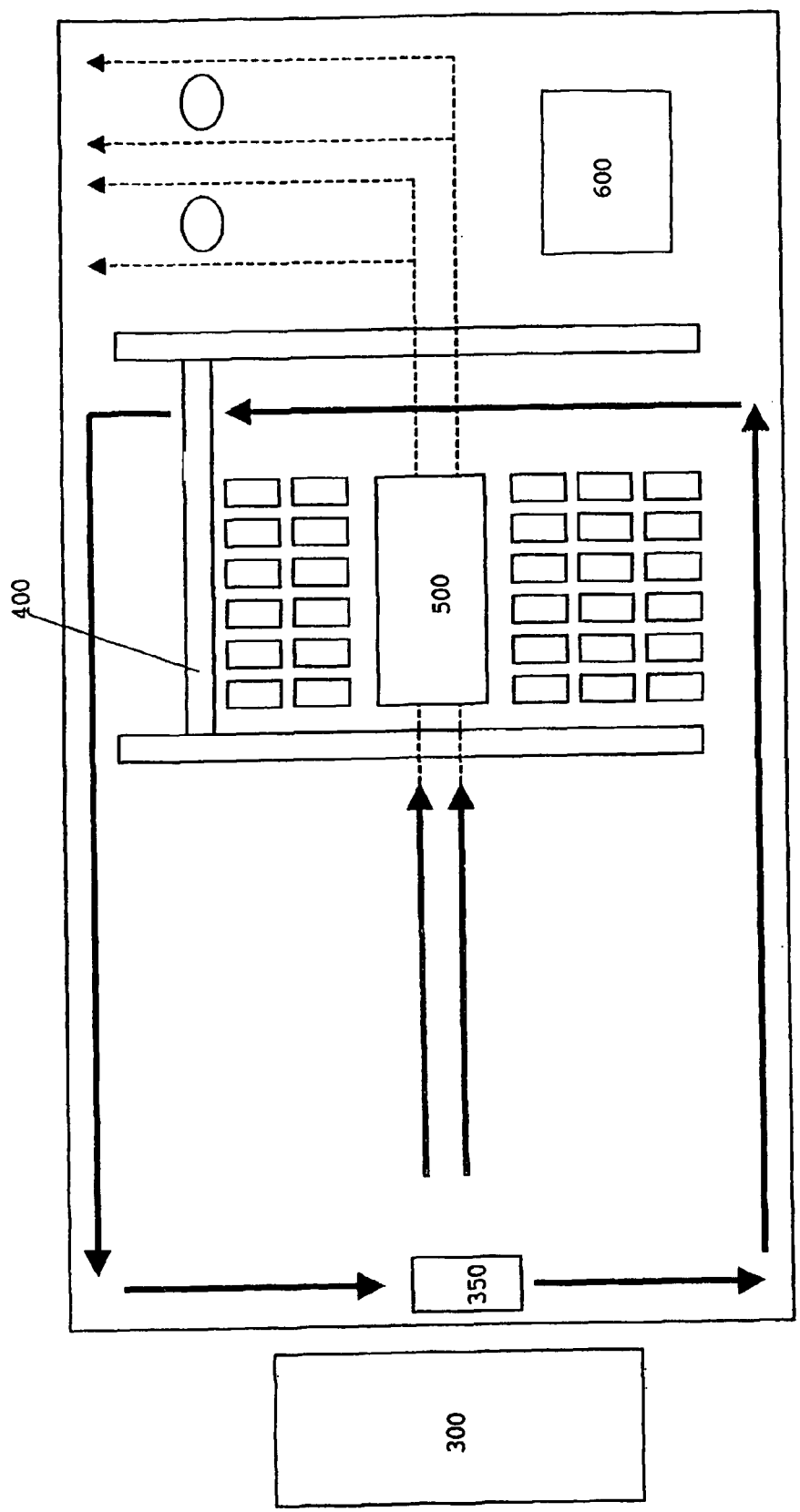
FIG. 13 shows a system for containerised handling of raw building materials at a port.

FIG. 13 illustrates a system for a container port for containerised handling of raw building materials. From a barge or container ship 300, the containers are unloaded by means of a crane or other means (not shown), and unloaded onto prime movers 350 for transfer to the stacking yard by another crane, typically a rubber-tyre gantry crane 400. Within the crane operating area, is a concrete production area 500, for instance the batching plant described earlier. Each component of concrete is loaded into the scaling station 60 to determine the amount before it is loaded into the station 70. This may include the relevant amount of water if it is required wet immediately. However, a customer may order only the raw building materials. In this case, a container with the required type of raw materials is retrieved by the crane, loaded onto a container truck for dispatch to the customer, without going through the concrete production area.

The containers from the barge or ship can also be known container mixers. In this case, the drums of the container mixers may already be carrying the right amounts of sand and aggregate to produce a common grade of concrete. These are stacked away for stockpiling or are sent to the production area 500 where water, cement and other additives are scaled and added to produce concrete. Alternatively, a separate grouting station 600 is provided just to fill these container mixers.

It is also possible to use the container of this invention for shipping or transferring of other materials or general cargoes that can be unloaded by opening of the base plate or sections of it. This general cargo includes, but not limited to, any one or more of: goods on pallets; materials in drums or cartons; and machinery. This container, further comprising one or more doors at one or more of the ends and/or sides allow easy loading of goods.

While only a few embodiments of the apparatus and system have been described and illustrated, it is to be understood that many changes, modifications and variations could be made to the present invention without departing from the scope of the invention.

The invention claimed is:

1. A containerized system for transferring bulk materials, and producing a mixture, being shaped and dimensioned in at least length and width to be handled as a standard freight container comprising:

a base, at least a portion of which is openable for discharging contents of the container therethrough, wherein said base comprises a plurality of downwardly sloped portions spaced apart from each other forming discharge chutes;

at least one compartment, the compartment having at least one lower section of reducing cross-sectional area, each leading to an opening, and a closure assembly for the opening, for releasing or retaining the compartment's contents; and a filter means disposed below the closure assembly for allowing fluid to drain through but keeping material inside the container;

wherein the container comprises a plurality of moveable covers on said discharge chutes operable to close and open the discharge chutes.

2. The containerized system according to claim 1, wherein the or at least one closure plate is arcuate and is arranged to have a substantially constant gap between it and its opening, as it is opened.

3. A containerized system for transferring bulk materials, and producing a mixture, being shaped and dimensioned in at least length and width to be handled as a standard freight container comprising:

a base, at least a portion of which is openable for discharging contents of the container therethrough, wherein said base comprises a plurality of downwardly sloped portions spaced apart from each other forming discharge chutes;

at least one compartment, the or each compartment having at least one lower section of reducing cross-sectional area, each leading to an opening, and a closure assembly for the or at least one opening, for releasing or retaining the compartment's contents;

lifting means attached to the upper sides of the covers to lift them from above;

wherein the container comprises a plurality of moveable covers on said discharge chutes operable to close and open the discharge chutes.

4. The containerized system according to claim 3, wherein said lifting means comprise flexible means chosen from the group comprising: cable, rope and chain.

5. A containerized system for transferring bulk materials, and producing a mixture, being shaped and dimensioned in at least length and width to be handled as a standard freight container comprising:
- a base, at least a portion of which is openable for discharging contents of the container therethrough, wherein said base comprises a plurality of downwardly sloped portions spaced apart from each other forming discharge chutes;
- at least one compartment, the or each compartment having at least one lower section of reducing cross-sectional area, each leading to an opening, and a closure assembly for the or at least one opening, for releasing or retaining the compartment's contents;
- wherein the container includes a plurality of triangular-shaped moveable covers on said discharge chutes operable to close and open the discharge chutes, the triangular-shaped moveable covers oriented so a weight of the bulk material on the covers induces self-closing of the covers.

6. The containerized system according to claim 5, wherein said covers can be vertically lifted to open the discharge chutes for discharge.

7. The containerized system according to claim 6, further comprising an actuator positioned below each of said covers for lifting said covers.

8. The containerized system according to claim 6, further comprising access means to allow actuators to access and lift said covers from below the container.

9. The containerized system according to claim 5, wherein the openable portion of the base comprises at least one pair of two cooperating halves, with one cooperating edge having an overlap over the other when said base is closed.

10. The containerized system according to claim 5, wherein said base further comprises sloping portions along both ends of the container to facilitate the discharge of the contents and prevent materials from accumulating at the ends during discharge.

11. The containerized system according to claim 5, being compartmentalized, the base of each compartment being openable and closable independently of each other.

12. The containerized system according to claim 5, further comprising one or more doors at one or more of the ends and/or sides.

13. The containerized system according to claim 5, wherein at least a portion of the top is slidably or hingably openable.

14. The containerized system according to claim 5, further comprising self locking means for securing the openable base portions in a closed position.

15. The containerized system according to claim 5, further comprising piston means for opening and closing the at least one openable portion of said base.

16. The containerized system according to claim 5, further comprising seal means around the at least one openable portion of said base, to prevent contamination of the movement mechanism and to minimize wastage of materials.

* * * * *

UNITED STATES PATENT AND TRADEMARK OFFICE
CERTIFICATE OF CORRECTION

PATENT NO. : 7,252,309 B2 Page 1 of 1
APPLICATION NO. : 10/480575
DATED : August 7, 2007
INVENTOR(S) : Eng Soon Goh et al.

It is certified that error appears in the above-identified patent and that said Letters Patent is hereby corrected as shown below:

On Title Page, Item No. (75), Inventors,
"Goh Eng Soon" should be --Eng Soon Goh--; and
"Goh Eng Hock" should be --Eng Hock Goh--.

Title Page, Item No. (57), Abstract, Line 11
"whee" should be --where--;

Column 7, Line 49
"FIG." should be --FIGS.--;

Signed and Sealed this

Twenty-ninth Day of July, 2008

JON W. DUDAS
*Director of the United States Patent and Trademark Office*